United States Patent
Mio et al.

(10) Patent No.: US 6,738,347 B1
(45) Date of Patent: May 18, 2004

(54) RATE CONTROL COMMUNICATION APPARATUS AND METHOD

(75) Inventors: Takeshi Mio, Tokyo (JP); Susumu Oka, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/211,006

(22) Filed: Dec. 15, 1998

(30) Foreign Application Priority Data

Jun. 12, 1998 (JP) .......................................... 10-164641

(51) Int. Cl.⁷ ............................................. H04L 12/26
(52) U.S. Cl. .................. 370/230; 370/419; 370/395.43; 370/464
(58) Field of Search .......................... 370/395.43, 464, 370/465, 474, 476, 537, 395.61, 468, 477, 532, 419, 230, 230.1, 236; 375/240.26, 240.28

(56) References Cited

U.S. PATENT DOCUMENTS

| 5,282,203 | A | * | 1/1994 | Oouchi ........................ 370/395 |
| 5,301,193 | A | * | 4/1994 | Toyofuku et al. ......... 370/395.4 |
| 5,500,672 | A | * | 3/1996 | Fujii ............................ 348/17 |
| 5,515,377 | A | * | 5/1996 | Horne et al. ................. 370/395 |
| 5,572,520 | A |   | 11/1996 | Schenk et al. |
| 5,671,226 | A | * | 9/1997 | Murakami et al. .......... 370/474 |
| 5,696,764 | A | * | 12/1997 | Soumiya et al. ............. 370/395 |
| 6,091,455 | A | * | 7/2000 | Yang ............................ 348/387 |
| 6,188,436 | B1 | * | 2/2001 | Williams et al. ............ 348/387 |
| 6,330,365 | B1 | * | 12/2001 | Yasuda et al. ............... 382/233 |
| 6,388,994 | B1 | * | 5/2002 | Murase ........................ 370/235 |
| 6,442,172 | B1 | * | 8/2002 | Wallner et al. ............. 370/416 |
| 6,496,522 | B1 | * | 12/2002 | Takizawa et al. ........... 370/535 |

FOREIGN PATENT DOCUMENTS

JP   08-195787   7/1996

OTHER PUBLICATIONS

Japanese abstract; JP4–212544 (A); Aug. 4, 1992.

* cited by examiner

Primary Examiner—Chi Pham
Assistant Examiner—Alexander O. Boakye
(74) Attorney, Agent, or Firm—Birch, Stewart, Kolasch & Birch, LLP

(57) ABSTRACT

The present invention introduces an apparatus and method for securing a constant bit rate in transmitting various types of media data through multiplexing over an ATM network so as to achieve a constant bit rate communication. Received video/audio information from an information source is encoded at an information source encoder and outputted to a media multiplexer as encoded video/audio information. The media multiplexer multiplexes encoded the video/audio information to obtain fixed-length data as transmission data. The media multiplexer, upon reception of a transmission enable signal from a line interface unit, transmits the transmission data to the line interface unit. The line interface unit assembles the transmission data on an ATM cell format basis and transmits cell data,over the ATM network.

19 Claims, 22 Drawing Sheets

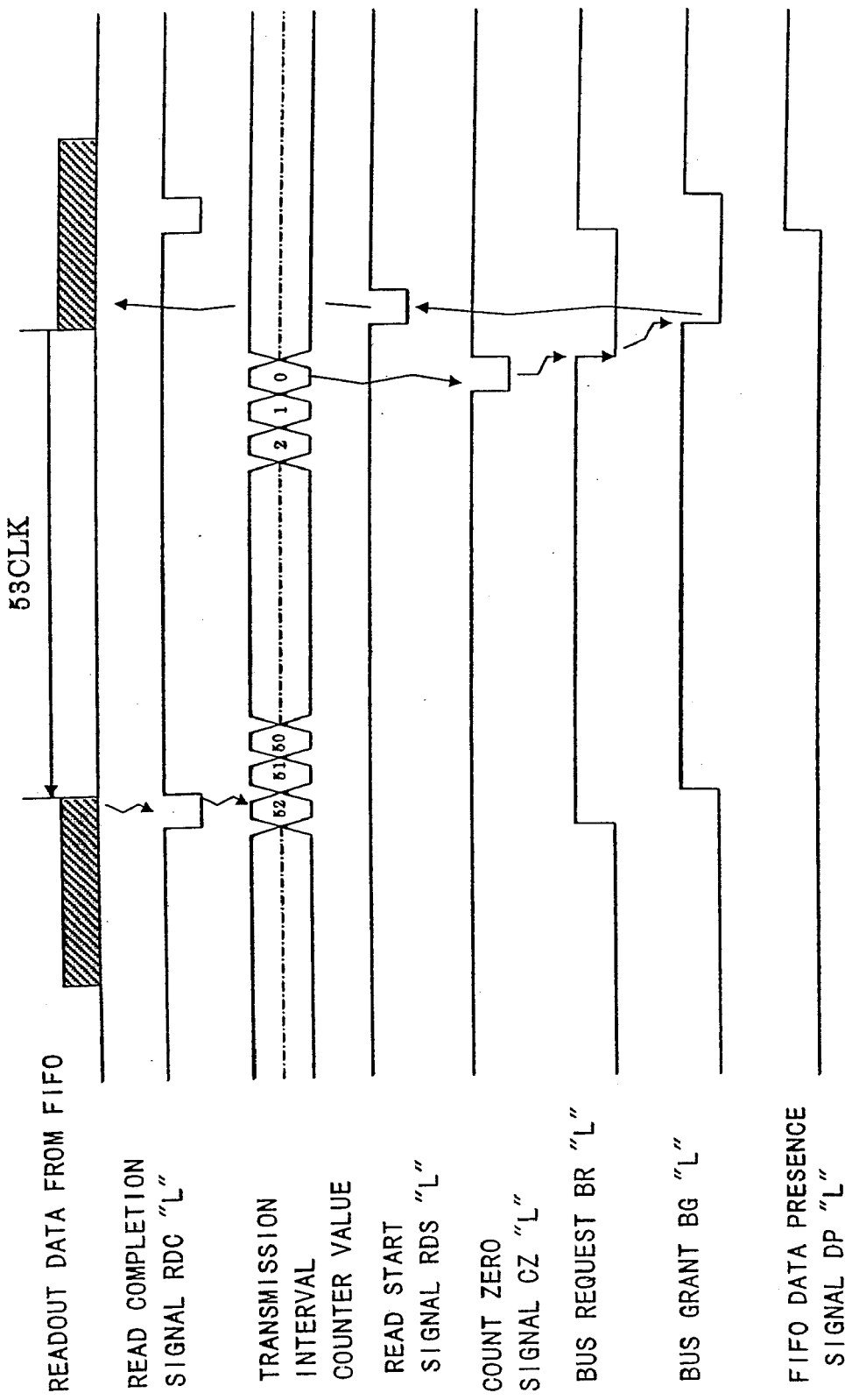

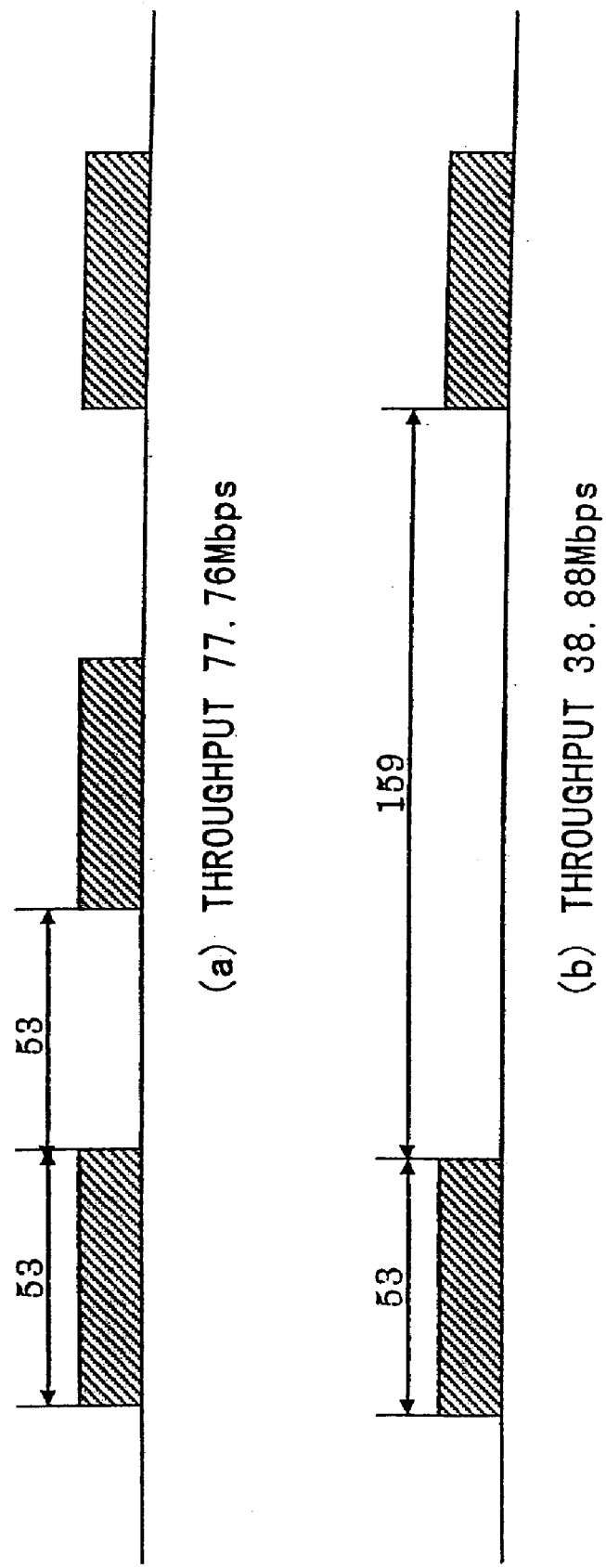

RATE CONTROL COMMUNICATION APPARATUS AND METHOD

BACKGROUND OF THE INVENTION

1. Field of the Invention

The present invention introduces a communication apparatus designed for a constant bit rate communication and a method for securing a constant bit rate of transmission data to be transmitted over variable or constant bit rate communications networks. The variable bit rate communications network includes an Asynchronous Transfer Mode (ATM) network and the like over which various types of data travel in a fixed-length packet format, and the constant bit rate communications network includes telephone line networks, communication satellite circuit networks and the like.

2. Description of the Related Art

In the Asynchronous Transfer Mode (ATM) representing a data transmission technique implemented in a broadband Integrated Services Digital Network (ISDN), for example, various types of media data having different characteristics such as video data, audio data, information data and the like are transmitted in a uniform length cell format of 53 bytes. In the ATM network, data are allowed to be transmitted at any bit rate within a maximum transfer capacity of the network under the condition that a maximum output cell rate, an average cell rate and the like are to be declared. This type of communication with a communication bit rate varying with time is called a variable bit rate communication and another type with the communication bit rate being constant is called a constant bit rate communication.

In a network over which data are transferred in a cell format such as the ATM network and the like, there exists a transport time lag (referred to as "a delay variation" hereinafter) between transmitting and receiving stations so that a transmission timing of transmission data at a transmitting station cannot be used at a receiving station. Then, it has been a general practice of eliminating the delay variation that data transmitted on a constant bit rate basis are temporarily stored in a variation absorbing buffer at a receiving station so as to smooth over the variation.

Conventionally, a constant bit rate communication can be achieved by controlling a transmission interval of cells to be transmitted over the network from a line interface.

A conventional system for achieving a constant bit rate in data transmission is disclosed by Japanese Unexamined Patent Publication No. 212544/1992. FIG. 18 shows a block diagram of an ATM packet adapter apparatus utilizing the rate control technique of the conventional system.

A conventional art to which the present invention is directed is discussed below with the conventional system being cited.

Referring to FIG. 18, an ATM packet adapter apparatus E1, transmission First-In First-Out (FIFO) units E2a through E2d, cell assembling units E3a through E3d, a call controller E4, a line interface (I/F) unit E5, terminals E6a through E6b with no ATM interface, a cell multiplexing bus E7, and a control bus E8 within the ATM packet adapter apparatus E1 (referred to as the control bus E8 hereinafter) are shown. The transmission FIFO units E2a through E2d, the cell assembling units E3athrough E3d, and the terminals E6a through E6b may be generically referred to, respectively, as a transmission FIFO unit E2, a cell assembling unit E3, and a terminal E6 hereinafter.

The ATM packet adapter apparatus E1 receives data from the terminal E6a, E6b, E6c at the cell assembling unit E3b, E3c, E3d, respectively, where the data are assembled to obtain cell data. The cell data are transferred to the transmission FIFO unit E2b, E2c, E2d to be stored temporarily. Meanwhile, the call controller E4 declares a maximum throughput of the data outputted from the terminal E6a, E6b, E6c to an ATM switching system through a call control sequence. The transmission FIFO unit E2b, E2c, E2d outputs the cell data according to a cell output interval being set based upon a maximum throughput determined by the call control sequence.

The call controller E4, upon reception of a call request from the terminal E6, declares a maximum throughput for the call request to the ATM network via the cell assembling unit E3a, the transmission FIFO unit E2a, the cell multiplexing bus E7 and the Line I/F unit E5. When the maximum throughput is accepted, the call controller E4 determines the maximum throughput as a maximum throughput for transmission.

The cell data from the terminals E6a through E6coutputted from the transmission FIFO units E2b through E2d are supplied to the multiplexing bus E7 to be multiplexed, and multiplexed cell data are transferred to the line I/F unit E5 for interfacing with the ATM network and transmitted over the ATM network.

FIG. 19 shows a block diagram illustrating the configuration of the transmission FIFO unit E2. Referring to the figure, an FIFO buffer E9 stores cell data from the cell assembling unit E3 temporarily, and an FIFO write controller E11 and an FIFO readout controller E12 control writing and reading, respectively, of the cell data in the FIFO buffer E9. The FIFO write controller E11, upon reception of the cell data from the cell assembling unit E3, detects the presence of the cell data and supplies a write signal WR to the FIFO buffer E9, and at the same time, supplies an FIFO data presence signal DP to a cell multiplexing bus controller E13. The cell multiplexing bus controller E13 provided for an arbitration control of the cell multiplexing bus E7 outputs a bus request (signal) BR to the cell multiplexing bus E7, and when receiving a bus grant (signal) BG in response, outputs a read start signal RDS to the FIFO readout controller E12.

A transmission interval controller E10 provided in the transmission FIFO unit E2 receives control information such as a set value for an input interval, the address data of the transmission FIFO unit E2, control data and the like from the call controller E4 via the control bus E8.

The transmission interval controller E10 controls the cell output interval of the cell data to be outputted to the cell multiplexing bus E7 so as to have the interval being longer than the set value. The transmission interval controller E10 includes a control bus I/F unit E14 for interfacing with the control bus E8, a transmission interval setting register E15 for latching the set value included in the control information, and a transmission interval counter E16 for counting down from the set value as an initial value. The transmission interval counter E16 outputs a count zero signal CZ indicating an end of counting to the cell multiplexing bus controller E13 when a counting is completed.

FIG. 20 shows a block diagram illustrating the configuration of the transmission interval controller E10. The control bus I/F unit E14 includes an address comparator E17 and a control bus controller E18. The control bus E8 here is assumed to include an eight-bit data bus for transmitting various types of control data, a 16-bit address bus for transmitting the address of each unit in the ATM packet adapter apparatus E1, and a control bus for transmitting a control signal (CS). The transmission interval controller E10 receives at the transmission interval setting register E15 a set value based upon a maximum throughput from the call controller E4 via the data bus, an address via the address bus at the address comparator E17, and the control signal CS via the control bus at the control bus controller E18. The address comparator E17 compares a received address with a self address to detect a matching of the received address with the self address of the transmission FIFO unit E2, and outputs a matching signal MS to the control bus controller E18 when detecting the matching. The control bus controller E18, based upon the matching signal MS and the control signal CS, outputs a data latch signal DL to the transmission interval setting register E15. The transmission interval setting register E15 latches the set value supplied via the data bus at an input timing of the data latch signal DL.

The operation of the thus configured conventional ATM packet adapter apparatus is now described. FIG. 21 is an output timing chart of cell data outputted to the cell multiplexing bus E7. FIG. 22 is a diagram illustrating a relation between transmission interval and throughput.

Upon reception of a call request issued from the terminal E6, the call controller E4 declares a maximum throughput for the call request to the ATM network via the cell assembling unit E3$a$, the transmission FIFO unit E2$a$, the cell multiplexing bus E7, and the line I/F unit E5. When the call request is accepted by the receiver, the call controller E4 determines the declared maximum throughput as a maximum throughput for transmission.

With the maximum throughput being determined, a set value for a transmission interval is set based upon the determined maximum throughput. For example, when the maximum throughput is set to 77.76 Mbps, then the set value is "52" because the transmission interval takes 53 clocks, as shown in FIG. 22($a$). When the maximum throughput is set to 38.88 Mbps, which requires a declaring, the set value is "158" because the transmission interval takes 159 clocks, as shown in FIG. 22($b$). The following expression calculates a clock S for the transmission interval, where TP denotes the maximum throughput.

$$S=(155.52\times 53)/TP-53$$

The set value for the transmission interval is obtained by subtracting 1 from a calculated value of the clock S in the call controller E4.

With the maximum throughput of the terminal E6 being set to 77,76 Mbps, for example, the minimum length of 53 clocks is required for the transmission interval, as shown in FIG. 22($a$). In this case, the call controller E4 determines that a value "52" is to be set as the set value in the transmission interval controller E10 for the transmission interval.

Specifically, the call controller E4 outputs an address of the transmission FIFO unit E2$b$ to the address bus of the control bus E8. When the address of self is detected at the address comparator E17 in the control bus I/F unit E14 and the control bus controller E18 detects the matching signal MS, the data latch signal DL is outputted to the transmission interval setting register E15. When a value "52" is outputted to the data bus in the control bus E8, the value "52" is given for the set value for the transmission interval at the transmission interval setting register E15.

A flow of cell data is now described. Data outputted from the terminal E6$a$ are assembled to obtain cells of 48 bytes with each cell adding an ATM header of five bytes to form cell data at the cell assembling unit E3$b$. The cell data outputted from the cell assembling unit E3$b$ are written into the FIFO buffer E9 in the transmission FIFO unit E2$b$ by the FIFO write controller E11.

The FIFO write controller E11 outputs the FIFO data presence signal DP to the cell multiplexing bus controller E13 whereby a bus request/grant sequence with the bus request signal BR and the bus grant signal BG is carried out for outputting the cell data to the cell multiplexing bus E7.

When the cell data are outputted from the FIFO buffer E9, the FIFO readout controller E12 outputs a read completion signal RDC "L" to the transmission interval controller E10 at a load input of the transmission interval counter E16.

Upon reception of the read completion signal RDC "L", the transmission interval counter E16 loads the value set "52" latched in the transmission interval setting register E15 as load input data and starts counting.

With a counted value "0", the transmission interval counter E16 outputs the count zero signal CZ "L" to the cell multiplexing bus controller E13, which triggers the bus request/grant sequence for outputting the cell data to the cell multiplexing bus E7. Subsequently, in the line I/F unit E5, the cell data are converted from an electric signal into a light signal to be transmitted over the ATM network.

The conventional art of the present invention has thus been described with Japanese Unexamined Patent Publication No. 212544/1992 being cited.

As aforementioned, the conventional ATM packet adapter apparatus is provided with the transmission interval control of cell data alone for obtain a constant bit rate communication. This poses the problem that a terminal can output data at any bit rate within a maximum throughput. As a result, a constant bit rate communication cannot be secured in an accurate manner with a generated amount of transmission data unstable with time, which prevents the variation absorbing buffer from absorbing the delay variation to be eliminated. A need then exists for securing a constant bit rate communication in an accurate manner so as to achieve the absorption of the delay variation by the variation absorbing buffer.

SUMMARY OF THE INVENTION

The present invention is directed to solving the foregoing problems. A primary object of the present invention is to introduce an apparatus and method for achieving a constant bit rate communication with a line interface unit for interfacing with a network line controlling the bit rate of transmission data outputted from a data source so as to secure a constant bit rate.

Another object of the present invention is to achieve a constant bit rate communication so as to eliminate the delay variation caused in the ATM network. Furthermore, another object of the present invention is to realize an apparatus and method for transmitting data at a constant bit rate over a constant bit rate communication network such as a telephone line network, a communication satellite circuit network or the like.

These and other objects are accomplished by the present invention as hereinafter described in further detail.

According to one aspect of the present invention, a rate control communication apparatus for transmitting data over a communication network includes an information source inputting unit for receiving information source data to be transmitted, an information source processing unit for processing the information source data to generate transmission data in a predetermined data format, and a line interface unit for outputting a transmission enable signal indicating a transmission enable status of the transmission data to the information source processing unit so as to have the transmission data outputted from the information source processing unit, receiving the transmission data, and transmitting the transmission data over the communication network.

The line interface unit may include a transmission control unit for calculating an output interval of the transmission enable signal and outputting the transmission enable signal to the information source processing unit based upon a calculated output interval.

The information source processing unit may include a media multiplexer for multiplexing the information source data received from the information source inputting unit.

The information source inputting unit may include an information source encoder for encoding the information source data.

The information source processing unit may temporarily store the transmission data to be outputted to the line interface unit, and the information source processing unit may generate and output dummy data alone to the line interface unit when an amount of the transmission data temporarily stored to be outputted to the line interface unit is less than a predetermined amount.

The information source processing unit may include a transmission request signal generator for generating a transmission request signal indicating a request for the transmission enable signal when the amount of the transmission data is more than the predetermined amount and outputting the transmission request signal to the line interface unit, and the line interface unit may monitor and detect a reception of the transmission request signal.

The line interface unit may output the transmission enable signal to the information source processing unit when detecting the reception of the transmission request signal, and output a dummy data transmission indication signal indicating a request for transmitting the dummy data when detecting no reception of the transmission request signal, and the information source processing unit may output the transmission data to the line interface unit upon reception of the transmission enable signal and output the dummy data to the line interface unit upon reception of the dummy data transmission indication signal.

The line interface unit may generate and transmit dummy data over the communication network when detecting no reception of the transmission request signal.

The information source processing unit may output a first control signal to the information source inputting unit so as to reduce a receiving amount of the information source data when storing the transmission data generated in more than the predetermined amount to be outputted to the line interface unit and output a second control signal to the information source inputting unit so as to increase the amount of the information source data to be received when storing the transmission data generated in less than the predetermined amount.

The information source processing unit may include a plurality of information source processing units, and the line interface unit may output a plurality of transmission enable signals respectively to the plurality of information source processing units, and the line interface unit may monitor an amount of the transmission data generated in each of the plurality of information source processing units through receptions of transmission request signals respectively from the plurality of information source processing units and output one of the plurality of transmission enable signals to a corresponding one of the plurality of information source processing units at a certain timing.

The rate control communication apparatus may further include a transmission data multiplexing bus for receiving a plurality of transmission data outputted from the plurality of information source processing units and multiplexing the plurality of transmission data.

The line interface unit may allocate outputs of the transmission enable signals to the plurality of information source processing units so as to have a transmitting frequency of each of the plurality of transmission data from the plurality of information source processing units fixed.

The line interface unit may allocate outputs of the plurality of transmission enable signals to the plurality of information source processing units based upon a transmitting priority assigned to each of the plurality of information source units, the transmitting priority indicating a transmitting order among the plurality of transmission data.

The line interface unit may monitor receptions of the transmission request signals from the plurality of information source processing units to recognize a generation characteristic of each of the plurality of transmission data, and change an output allocation of the plurality of transmission enable signals to corresponding information source processing units dynamically based upon the generation characteristic.

The line interface unit may change the transmitting priority assigned to each of the plurality of information source processing units dynamically.

The information source processing unit may store low priority transmission data to be transmitted through a line when a communication band is not fully occupied by transmission data, and the line interface unit may transmit the low priority transmission data through the line when the communication band is not fully occupied by transmission data.

According to another aspect of the present invention, a rate control communication method for transmitting data over a communication network includes the steps of inputting information source data to be transmitted, processing the information source data to generate transmission data in a predetermined data format, and line interfacing for outputting a transmission enable signal indicating a transmission enable status of the transmission data generated in the processing step so as to have the transmission data outputted, receiving the transmission data, and transmitting the transmission data to the communication network.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 21 is an output timing chart of cell data according to the conventional art; and FIG. 22 is a diagram illustrating a relation between transmission interval and throughput according to the conventional art.

DETAILED DESCRIPTION OF THE PREFERRED EMBODIMENTS

Figure 1:
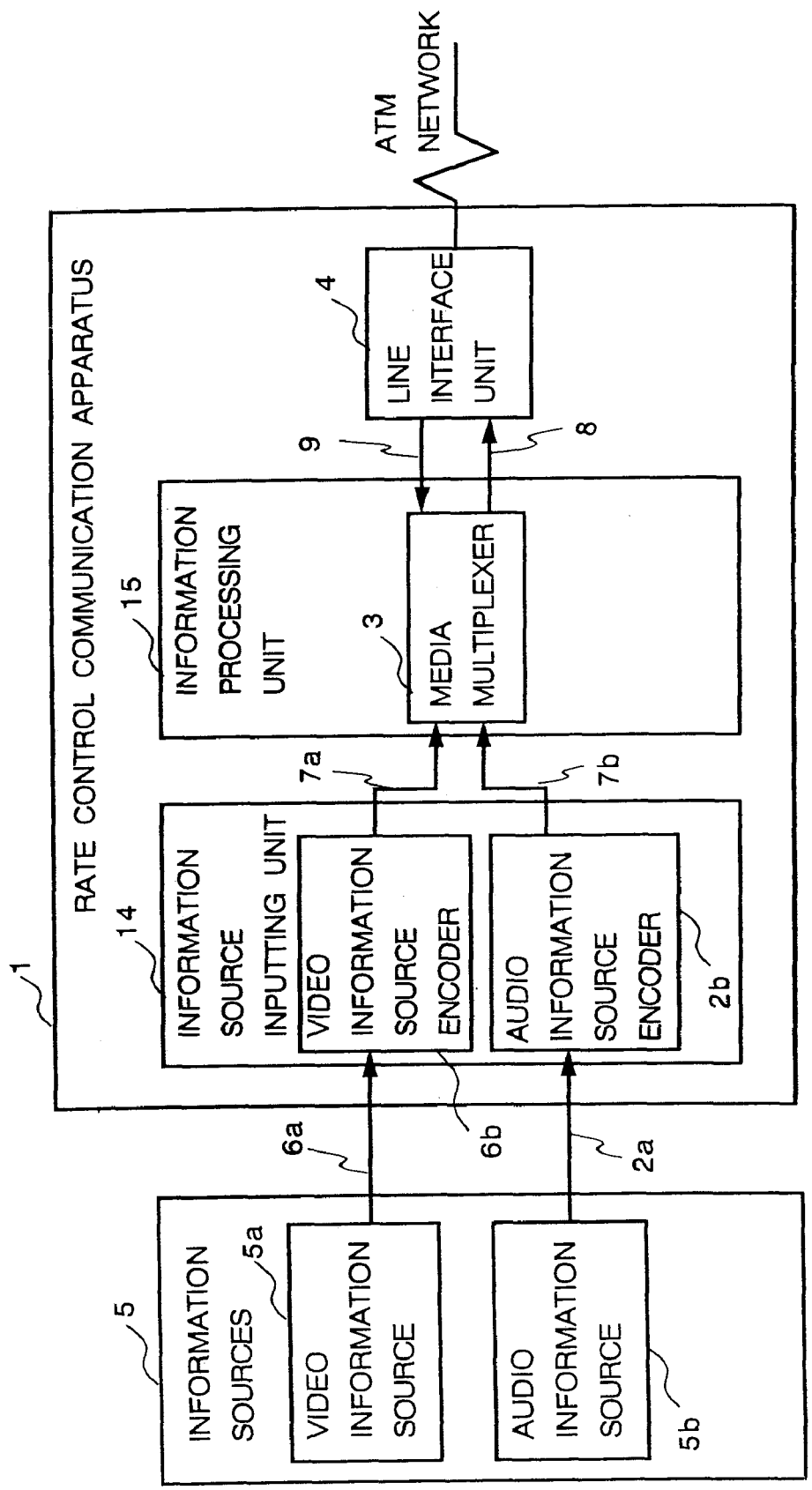
FIG. 1 shows a block diagram of a rate control communication apparatus according to a first embodiment of the present invention.

Reference will now be made in detail to the present preferred embodiments of the invention, examples of which are illustrated in the accompanying drawings, wherein like reference numerals indicate like elements through out the several views.

A rate control communication apparatus according to the present invention is directed to a bit rate control of transmission data so as to achieve a constant bit rate communication in an accurate and sophisticated manner. The rate control communication apparatus is provided with a line interface unit, for interfacing with a line of a communication network such as an ATM network and the like in which data are allowed to be transmitted at a variable rate, outputting a transmission enable signal on a fixed cycle to a data source, and the data source receiving the transmission enable signal and outputting fixed-length data in response.

Embodiment 1

A first embodiment of the present invention is now discussed with reference to FIGS. 1 through 3. FIG. 1 shows a block diagram illustrating a rate control communication apparatus 1 according to the first embodiment of the present invention. Referring to the figure, the rate control communication apparatus 1 is composed of an information source inputting unit 14, an information source processing unit 15, and a line interface unit 4. The information source inputting unit 14 includes video and audio information source encoders 2a and 2b. The information source processing unit 15 includes a media multiplexer 3. An information source 5 includes a video information source 5a and an audio information source 5b as examples. The video information source 5a may be a device generating a video signal such as a television camera or the like. Video information 6a and audio information 6b are the sources of information to be transmitted over a communication network. Information source data to be transmitted are represented by encoded video information 7a and encoded audio information 7b here. Transmission data 8 and a transmission enable signal 9 are further shown in the figure.

Figure 2:
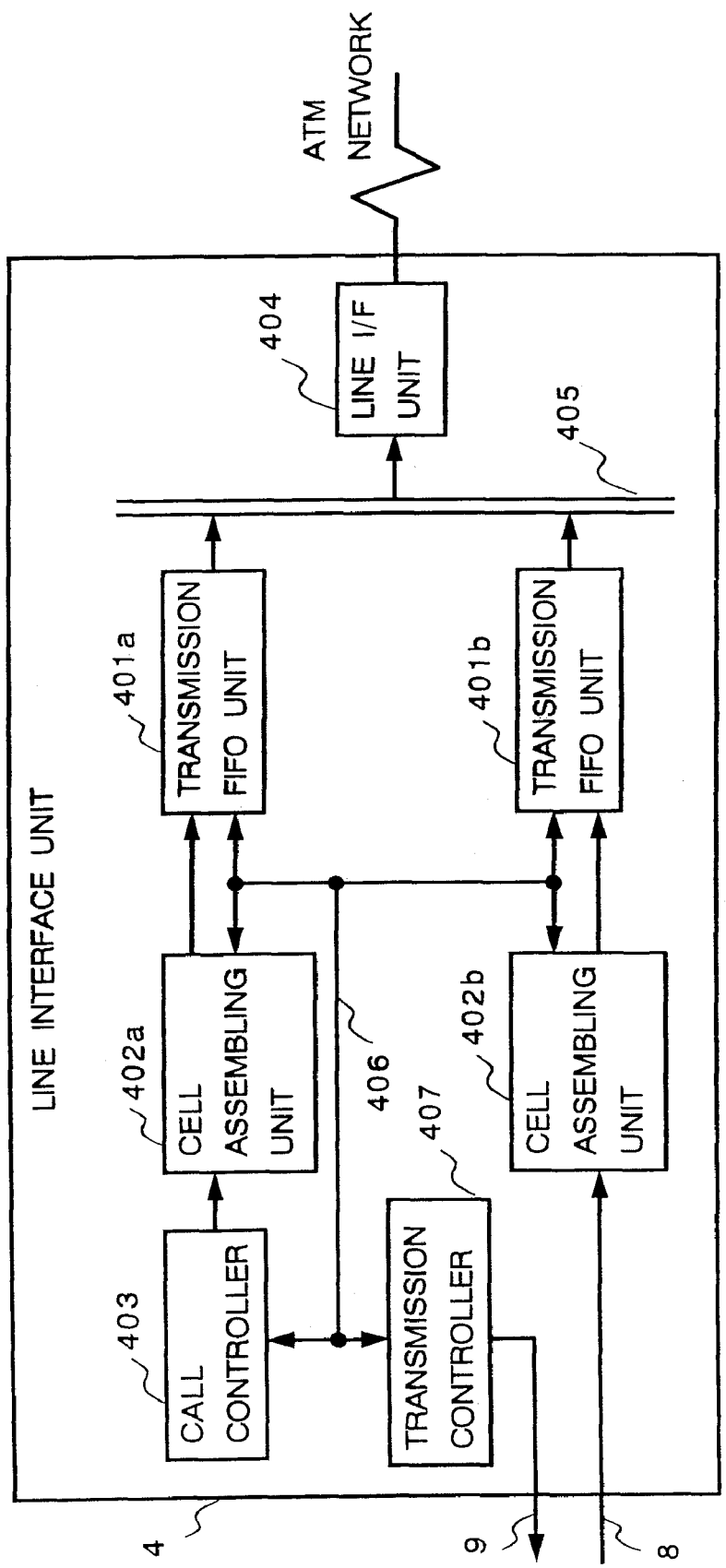
FIG. 2 shows a block diagram of a line interface unit of the first embodiment of the present invention.

FIG. 2 shows a block diagram illustrating an internal configuration of the line interface unit 4. The line interface unit 4 is composed of a transmission FIFO units 401a and 401b, cell assembling units 402a and 402b, a call controller 403, a line I/F unit 404, a cell multiplexing bus 405, a control bus within the line interface unit 406, and a transmission controller 407. All the components of the line interface unit 4 identified above except for the transmission controller 407 are assumed to be the same in operation as those of the ATM packet adapter apparatus described in the conventional art.

In the transmission controller 407, the transmission rate of the transmission data 8 is calculated based upon a maximum throughput determined by the call controller 403. Then, an output interval or a fixed output cycle of the transmission enable signal 9 is determined based upon a calculated transmission rate, a maximum throughput of the data transfer channel from the media multiplexer 3 to the line interface unit 4, and a transfer size of the transmission data 8. The transmission enable signal 9 is outputted to the media multiplexer 3 on the fixed output cycle determined.

An operation of the rate control communication apparatus of the first embodiment is now described. The information source encoder 2a, 2b in the information source inputting unit 14 encodes the video/audio information 6a, 6b received from the video/audio information source 5a, 5b. Resultant encoded data are outputted to the media multiplexer 3 as the encoded video/audio information 7a, 7b.

Specifically, in the information source encoder 2a, the video information 6a received from the video information source 5a is subjected to an information source encoding method corresponding to ISO/IEC 13818-2 (MPEG-2 Video) standard, for example, and outputted to the media multiplexer 3 as the encoded video information 7a. In the information source encoder 2b, the audio information 6b received from the audio information source 5b is subjected to an information source encoding method corresponding to ISO/IEC 11172-3 (MPEG-1 Audio) standard, for example, and outputted to the media multiplexer 3 as the encoded audio information 7b.

The media multiplexer 3 in the information source processing unit 15 multiplexes the encoded video/audio information 7a, 7b received from the information source encoder 2a, 2b to generate fixed-length transmission data to obtain the transmission data 8, The transmission data 8 are stored in the media multiplexer 3 until the transmission enable signal 9 arrives from the line interface unit 4 and then outputted to the line interface unit 4 in response.

Specifically, in the media multiplexer 3, the encoded video/audio information 7a, 7b is subjected to the multiplexing method of ISO/IEC 13818-1 (MPEG-2Systems), for example, to form a fixed-length Transport Stream Packet (TSP).

The media multiplexer 3 outputs the transmission data 8 on a fixed-length data basis (e.g., a fixed-length TSP here) to the cell assembling unit 402b in the line interface unit 4 upon each reception of the transmission enable signal 9 from the transmission controller 407 of the line interface unit 4.

Figure 3:
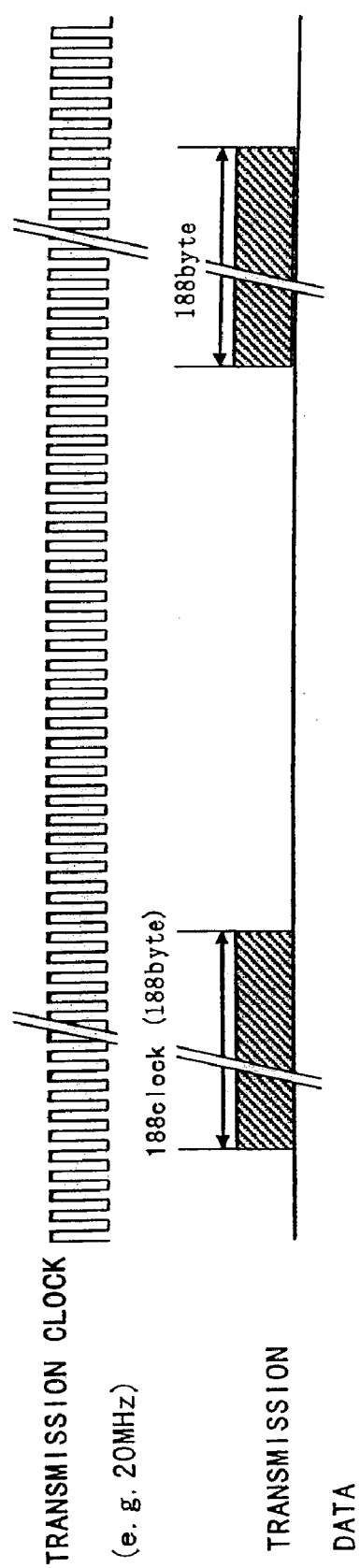
FIG. 3 is a timing chart illustrating an operation of the first embodiment of the present invention.

The maximum throughput of the data transfer channel from the media multiplexer 3 to the line interface unit 4 is set to a larger value than that of the maximum throughput of an ATM network, as shown in FIG. 3, for example. The transmission data 8 are transferred through the data transfer channel in a fixed-length data format (e.g., a TSP length of 188 bytes in FIG. 3).

The media multiplexer 3, when generating and storing the transmission data 8 in less than a predetermined amount, upon reception of the transmission enable signal 9, outputs dummy data (a Null TSP here) alone to the line interface unit 4. The same effect can be obtained by outputting a combination of transmission data and dummy data according to this embodiment.

In the line interface unit 4, the transmission data 8 are assembled to obtain cell data to be transmitted over the ATM network.

In the case of transmitting data over a communication network other than the ATM network, transmission data are processed in accordance with a specific characteristic of the communication network before transmission.

Thus, fixed-length data are outputted in response to the transmission enable signal 9, which is outputted on the fixed output cycle, thereby achieving a constant bit rate communication with the bit rate accurately controlled.

As aforementioned, a constant bit rate communication is achieved by securing a constant bit rate with the rate control communication apparatus of this embodiment used in a network such as the ATM network and the like over which various types of media data such as video data, audio data, information data and the like are transmitted in a packet format. The rate control communication apparatus includes the information source encoder for processing various types of media data such as video data, audio data, information data and the like through a high efficient coding method to obtain encoded information of the various types of data, the media multiplexer for multiplexing the encoded data of the various types of data to obtain the transmission data and outputting the transmission data in an arbitrary data format of fixed length or dummy data upon reception of the transmission enable signal, and the line interface unit for outputting the transmission enable signal to the media multiplexer on the fixed output cycle.

Only two types of media data of video and audio data are employed in this embodiment as the information source for the purpose of simplifying the figure. In practice, alternatively, information data and the like and even multiplexed data of various types of media data may be added. This applies to the following embodiments, of course.

Further, the information source inputting unit 14 including the information source encoders 2a and 2b and the information source processing unit 15 including the media multiplexer 3 are only examples of this embodiment, which do not limit the components of those units according to the present invention.

Figure 17:
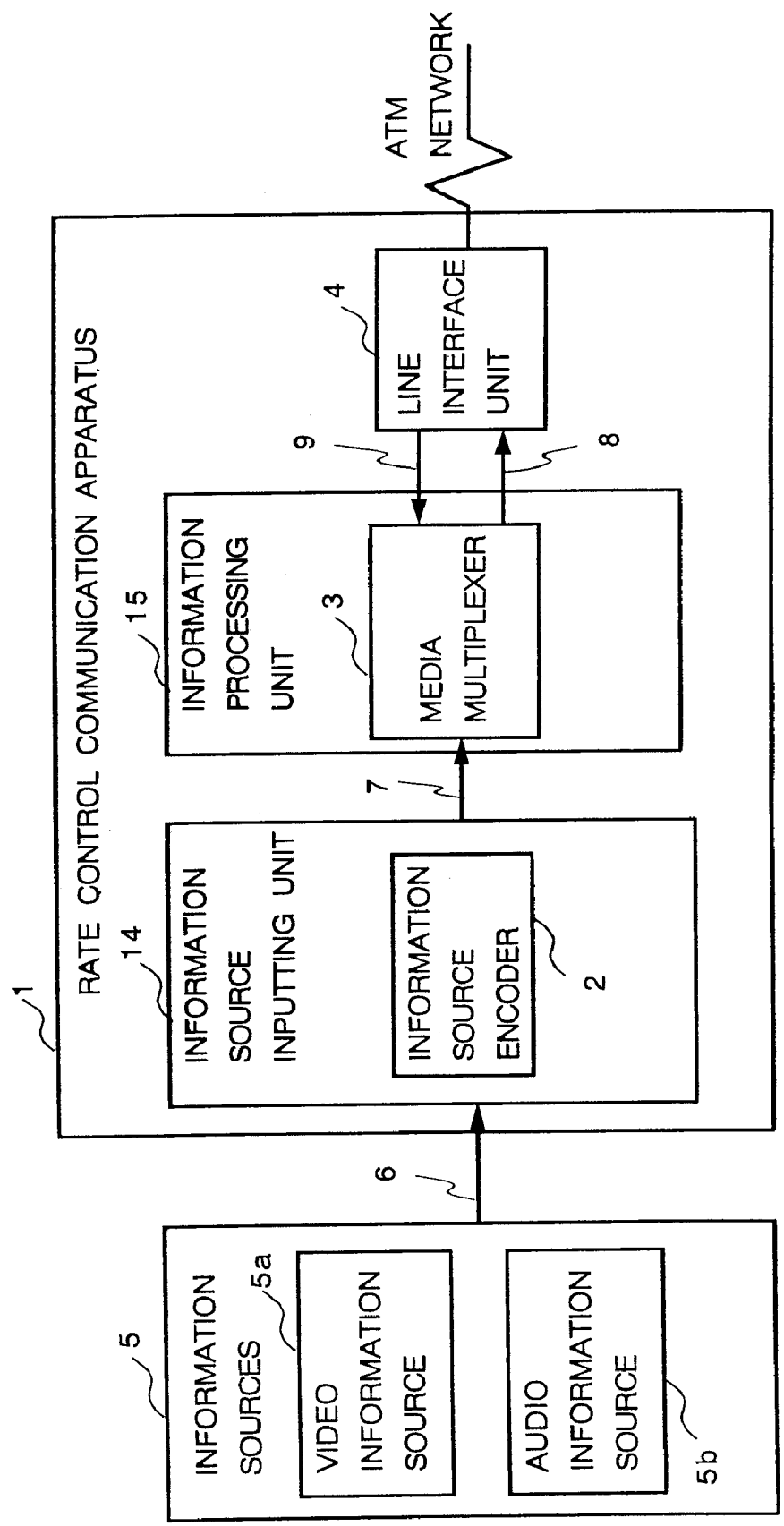
FIG. 17 shows a block diagram of a simplified type of the rate control communication apparatus of the first embodiment of the present invention.
Figure 18:
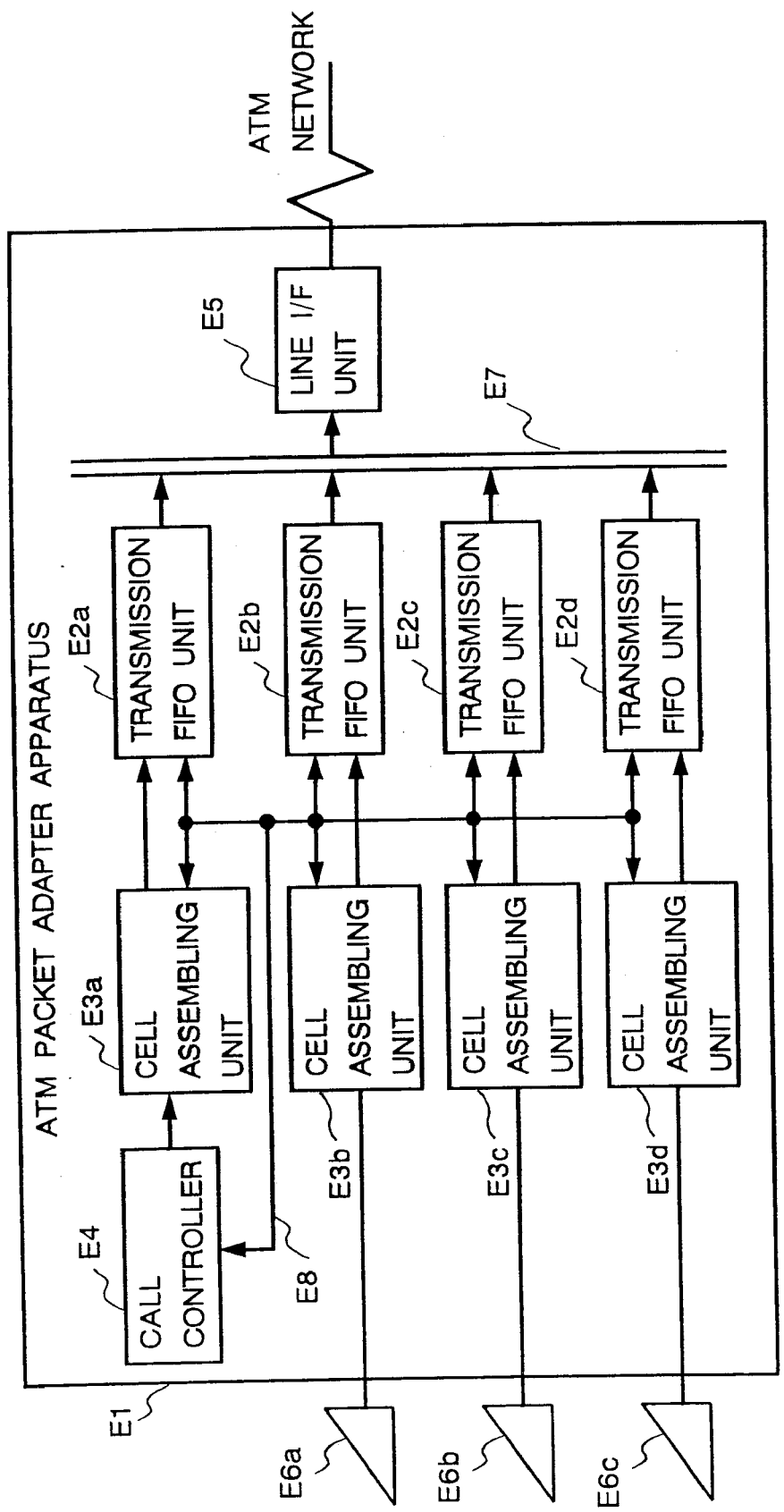
FIG. 18 shows a block diagram of an ATM packet adapter apparatus provided with a cell transmission interval control function according to a conventional art of the present invention.
Figure 19:
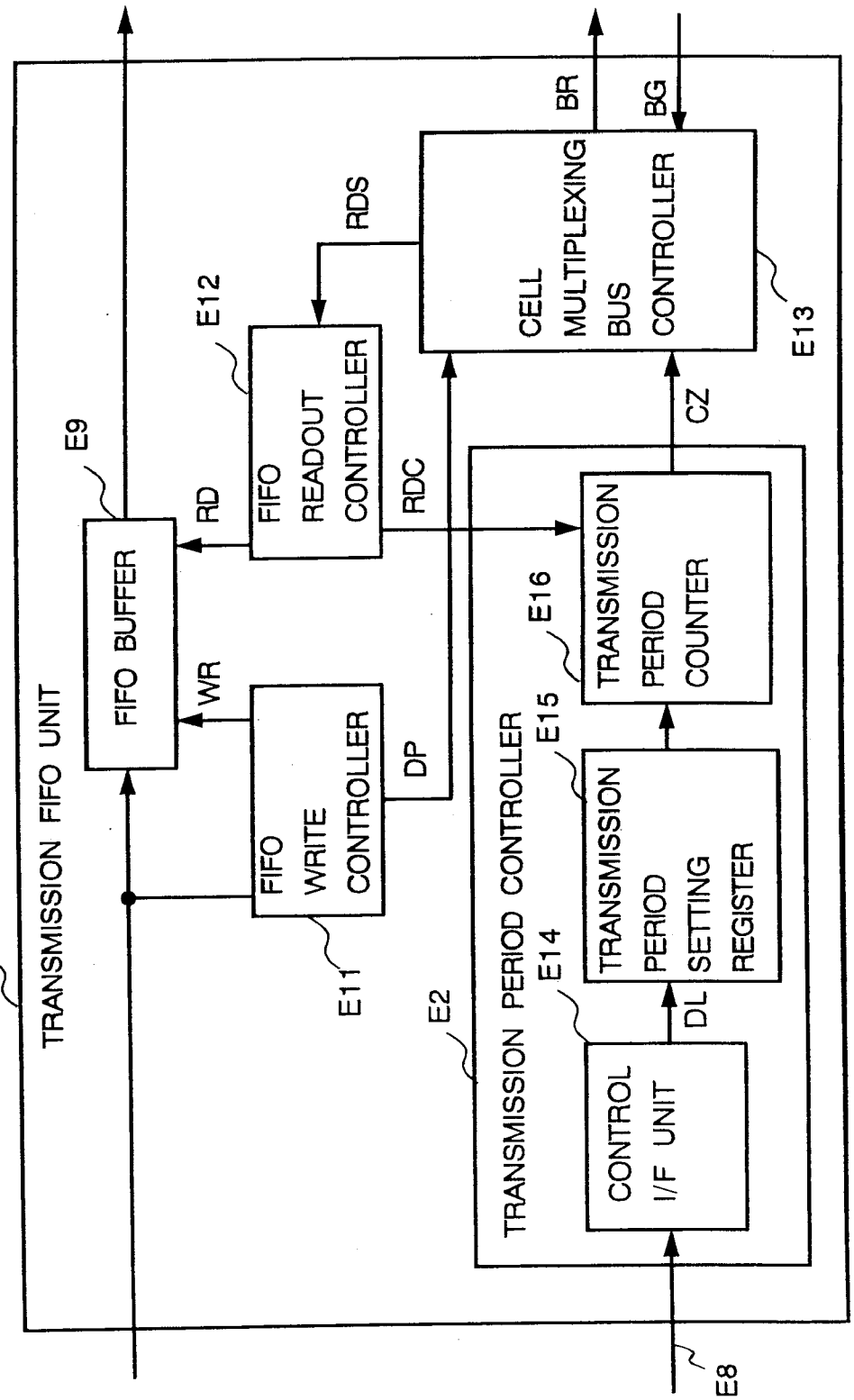
FIG. 19 shows a block diagram of a transmission FIFO unit of the conventional art.
Figure 20:
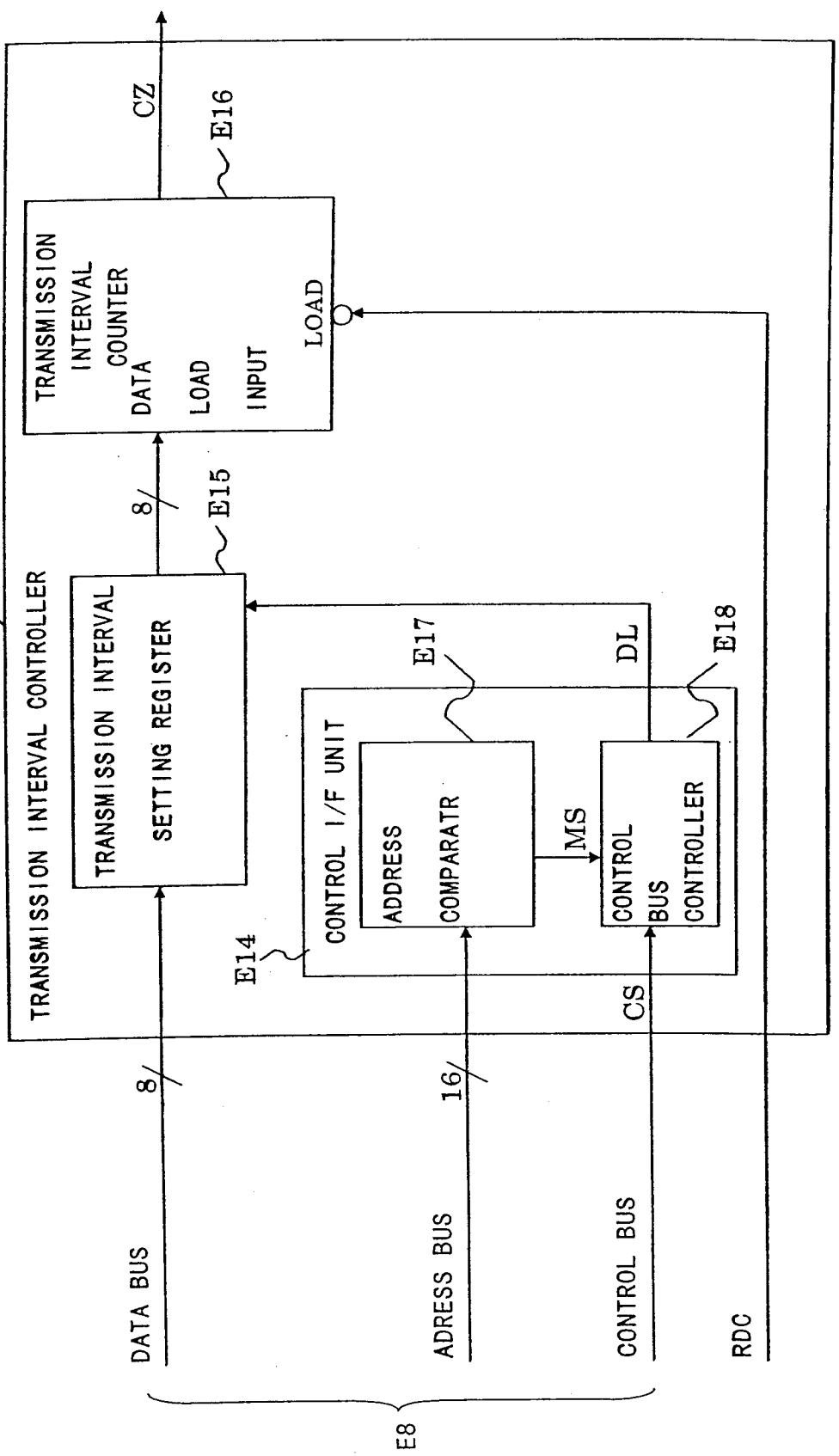
FIG. 20 shows a block diagram of a transmission interval controller of the conventional art.

Furthermore, as shown in FIG. 17, the information source inputting unit 14 may be composed of a single information source encoder.

Embodiment 2

A second embodiment of the present invention is now discussed with reference to FIGS. 4 through 6. The transmission data 8 are transferred from the media multiplexer 3 based only upon a unilateral signal of the transmission enable signal 9 from the line interface unit 4 according to the first embodiment, whereas this embodiment involves monitoring of a stored condition of the transmission data 8 in a media multiplexer 3.

Figure 4:
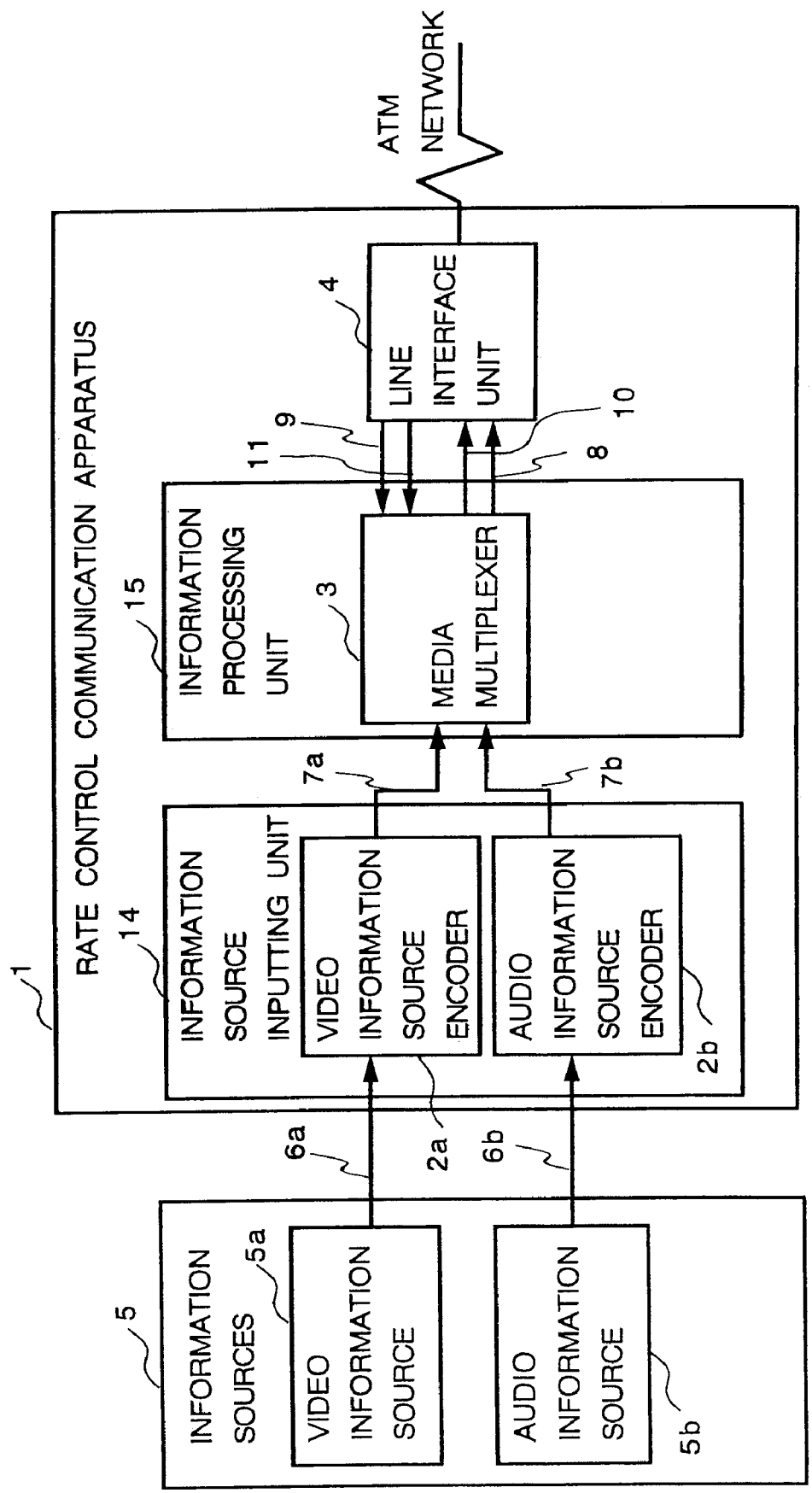
FIG. 4 shows a block diagram of a rate control communication apparatus according to a second embodiment of the present invention.

FIG. 4 shows a block diagram illustrating the configuration of a rate control communication apparatus 1 according to this embodiment. The rate control communication apparatus 1 of FIG. 4 modifies the rate control communication apparatus 1 of FIG. 1 of the first embodiment by adding a transmission request signal 10 and a dummy data transmission indication signal 11.

The transmission request signal 10 is outputted from the media multiplexer 3 when the transmission data 8 are stored in more than a predetermined amount (e.g. 1TSP) in the media multiplexer 3.

The dummy data transmission indication signal 11 is outputted from a line interface unit 4 when the transmission request signal 10 is not outputted from the media multiplexer 3, which means that the transmission data 8 are stored in less than a predetermined amount in the media multiplexer 3. The dummy data transmission indication signal 11 indicates a request for outputting dummy data for stuffing to the line interface unit 4.

Figure 5:
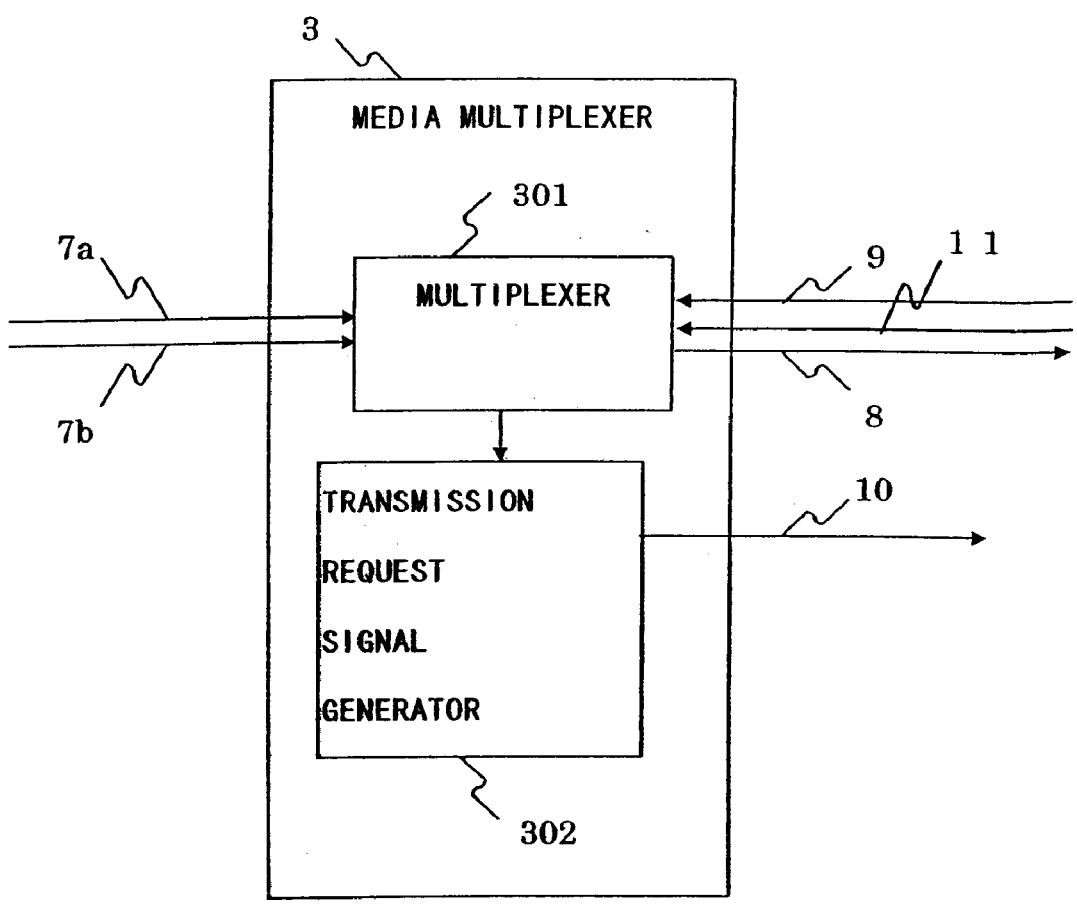
FIG. 5 shows a block diagram of a media multiplexer of the second embodiment of the present invention.

FIG. 5 shows a block diagram illustrating the configuration of the media multiplexer 3 of this embodiment. The media multiplexer 3 is composed of a multiplexer 301 and a transmission request signal generator 302. The multiplexer 301 receives the transmission enable signal 9 and the dummy data transmission indication signal 11. The transmission request signal generator 302 monitors the multiplexer 301 to detect a state of the transmission data 8 being stored in more than a predetermined amount, and outputs the transmission request signal 10 to the line interface unit 4.

Figure 6:
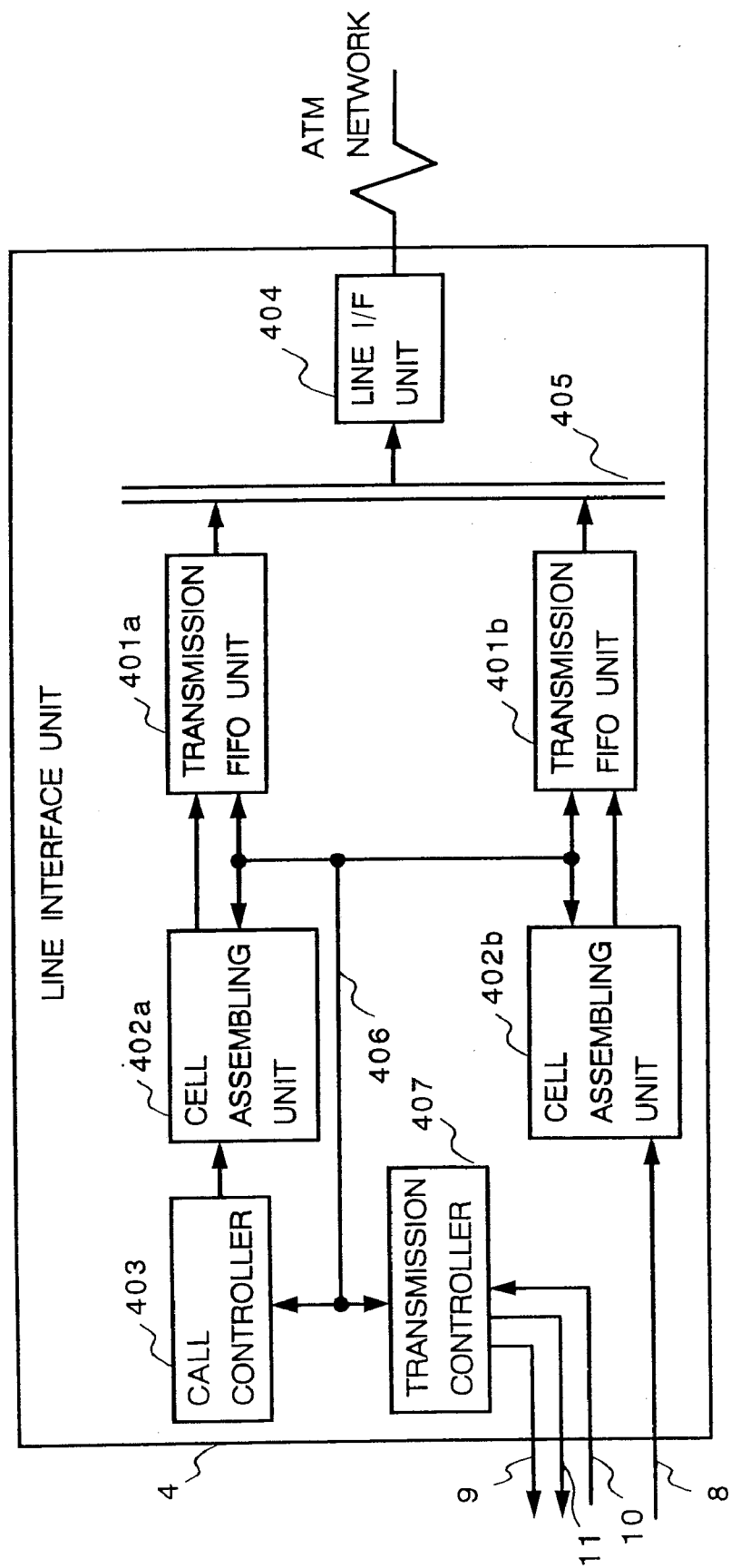
FIG. 6 shows a block diagram of a line interface unit of the second embodiment of the present invention.

FIG. 6 shows a block diagram illustrating the configuration of the line interface unit 4 of this embodiment. A transmission controller 407 receives the transmission request signal 10 from the media multiplexer 3, and outputs the dummy data transmission indication signal 11 to the media multiplexer 3.

An operation of the rate control communication apparatus of the second embodiment is now described. The transmission request signal generator 302 outputs the transmission request signal 10 to the line interface unit 4 when the transmission data 8 are stored in more than a predetermined amount in the multiplexer 301.

The transmission controller 407 outputs the transmission enable signal 9 based upon a reception of the transmission request signal 10. When detecting the reception of the transmission request signal 10, the transmission controller 407 outputs the transmission enable signal 9, and outputs the dummy data transmission indication signal 11 when detecting no reception.

The multiplexer 301 outputs the transmission data 8 in response to a reception of the transmission enable signal 9, and outputs dummy data (e.g. a Null TSP here) alone upon reception of the dummy data transmission indication signal 11.

Thus, according to this embodiment, a constant bit rate communication can be achieved with the function of monitoring the amount of the transmission data 8 whether to be stored in more than a predetermined amount in the media multiplexer 3 by the transmission controller 407 in the line interface unit 4, and supplying dummy data for stuffing for a shortage of transmission data when the transmission data 8 are stored in less than the predetermined amount.

As aforementioned, a constant bit rate communication is achieved by securing a constant bit rate with the rate control communication apparatus of this embodiment having the function that dummy data for stuffing are supplied in response to the dummy data transmission indication signal by the media multiplexer including the transmission request signal generator for outputting the transmission request signal to the line interface unit when generating and storing the transmission data in more than a predetermined amount, and the function of monitoring the transmission request signal to be received in the line interface unit to output the transmission enable signal to the media multiplexer based upon the reception of the transmission request signal, and output the dummy data transmission indication signal to the media multiplexer when detecting a shortage of the transmission data for transmit information to be transmitted over a network line.

Embodiment 3

Figure 7:
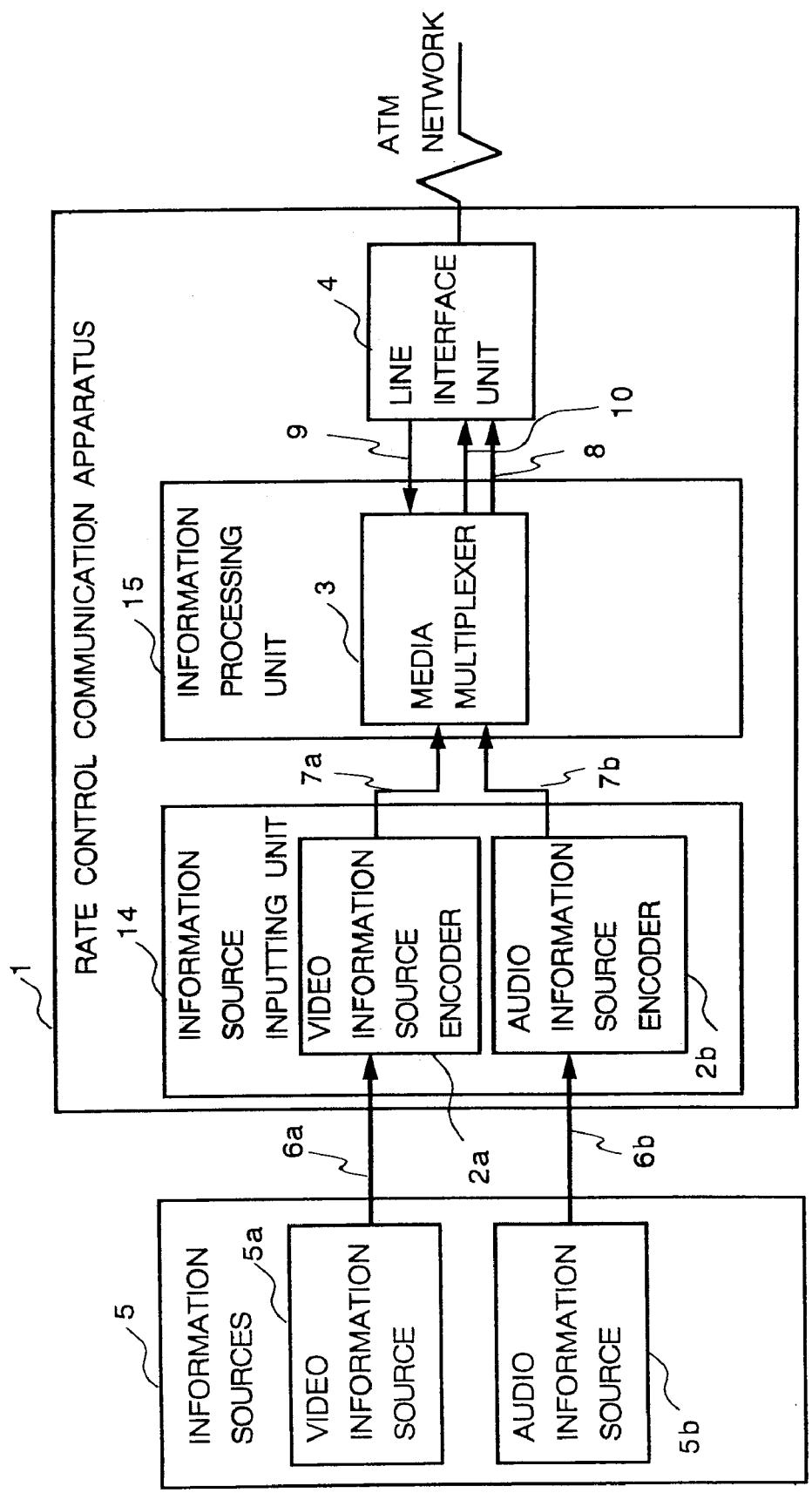
FIG. 7 shows a block diagram of a rate control communication apparatus according to a third embodiment of the present invention.
Figure 8:
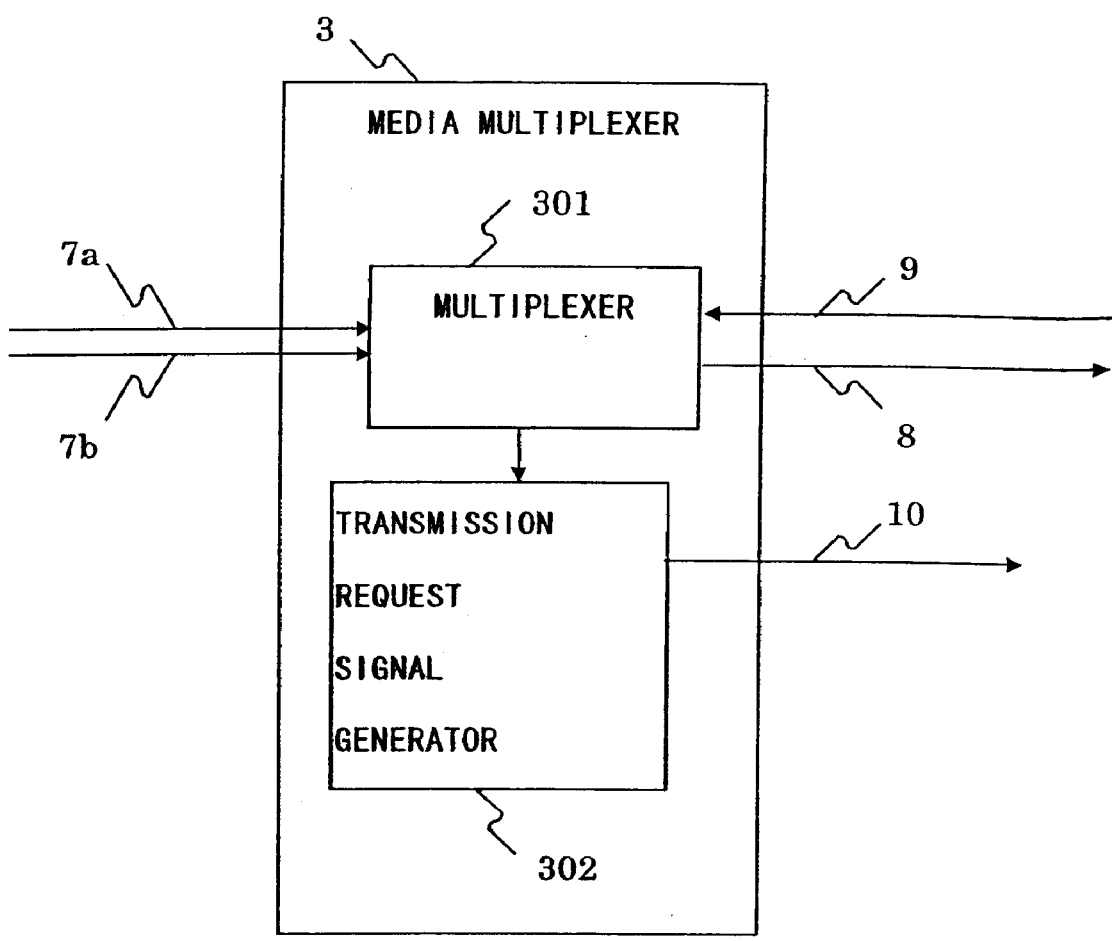
FIG. 8 shows a block diagram of a media multiplexer of the third embodiment of the present invention.
Figure 9:
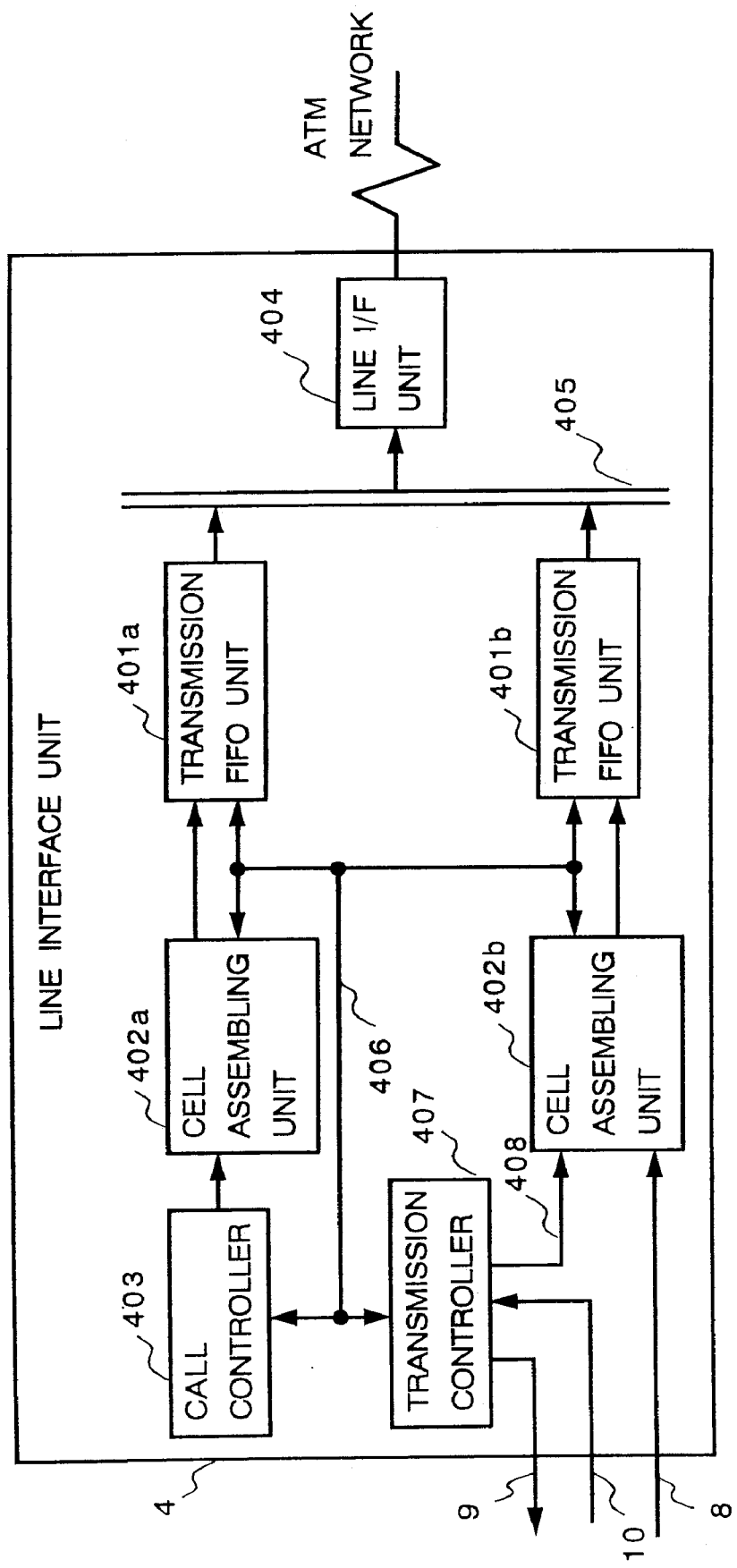
FIG. 9 shows a block diagram of a line interface unit of the third embodiment of the present invention.

A third embodiment of the present invention is now described with reference to FIGS. 7 through 9. FIGS. 7, 8 and 9 show block diagrams illustrating the configurations of a rate control communication apparatus 1, a media multiplexer 3, and a line interface unit 4, respectively, of this embodiment. Referring to FIG. 9, a dummy data transmission indication signal 408 may be replaced by dummy data.

An operation of the rate control communication apparatus of the third embodiment is now described. The rate control communication apparatus of this embodiment employs another example of watching the stored condition of the transmission data 8 in the media multiplexer 3 similar to that of the second embodiment. However, a transmission controller 407 of the line interface unit 4 of this embodiment outputs the dummy data transmission indication signal 408 directly to a cell assembling unit 402b within the line interface unit 4 when detecting no reception of the transmission request signal 10 from the transmission request signal generator 302 of the media multiplexer 3, which is different from the second embodiment. Upon reception of the dummy data transmission indication signal 408, the cell assembling unit 402b supplies dummy data alone for stuffing to be transmitted for the transmission data 8.

Thus, according to this embodiment, a constant bit rate communication can be achieved with the function of supplying dummy data for stuffing for the transmission data 8 by the cell assembling unit 402b.

As aforementioned, a constant bit rate communication is achieved by securing a constant bit rate with the rate control communication apparatus of this embodiment including the media multiplexer having the transmission request signal generator for outputting the transmission request signal when the transmission data are stored in more than a predetermined amount, and having the function of the line interface unit outputting the transmission enable signal to the media multiplexer when detecting the reception of the transmission request signal, and supplying dummy data by itself when detecting no reception of the transmission request signal indicating a shortage of the transmission data for transmit information to be transmitted over a (network) line.

Embodiment 4

Figure 10:
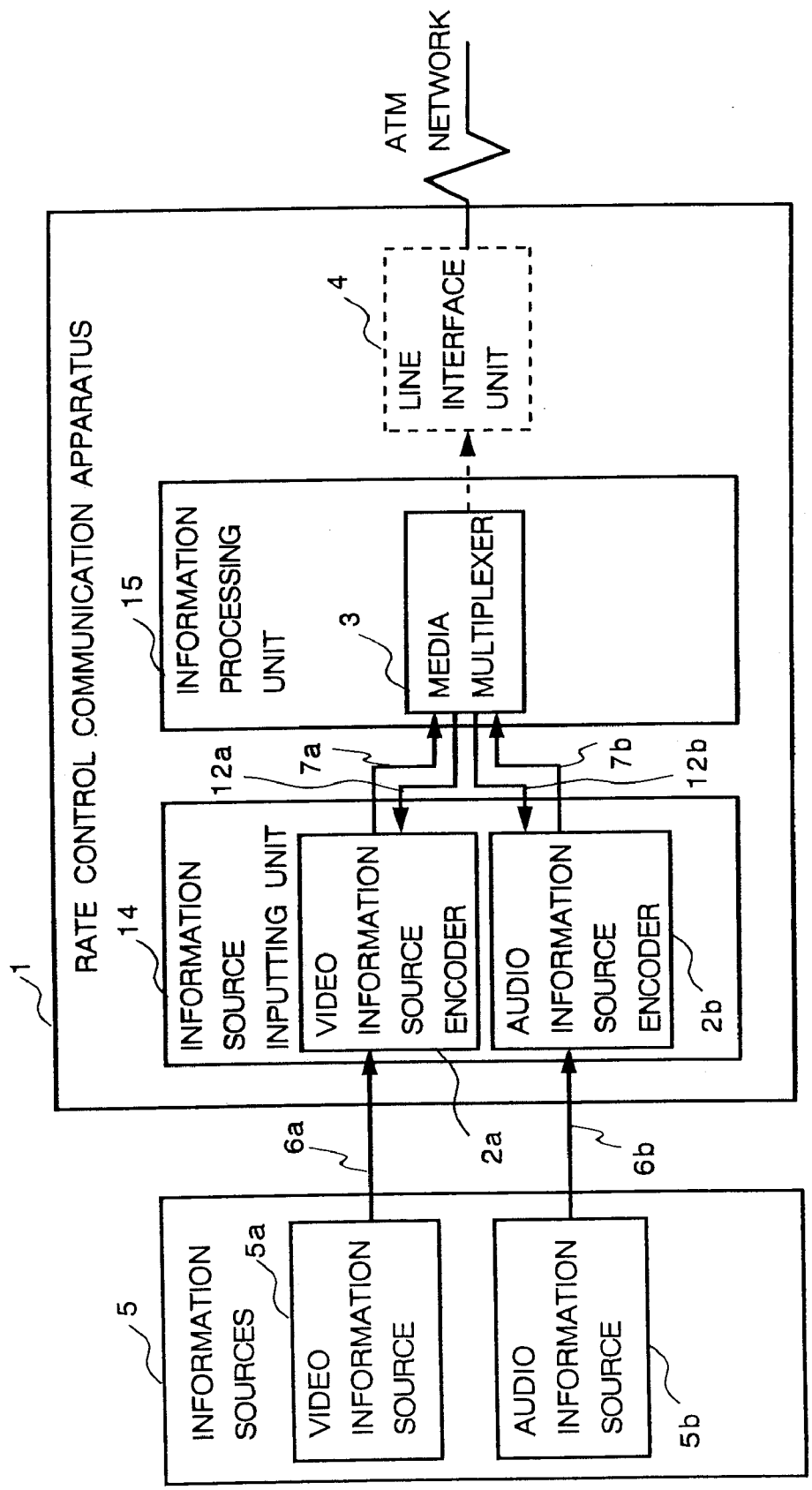
FIG. 10 shows a block diagram of a rate control communication apparatus according to a fourth embodiment of the present invention.
Figure 11:
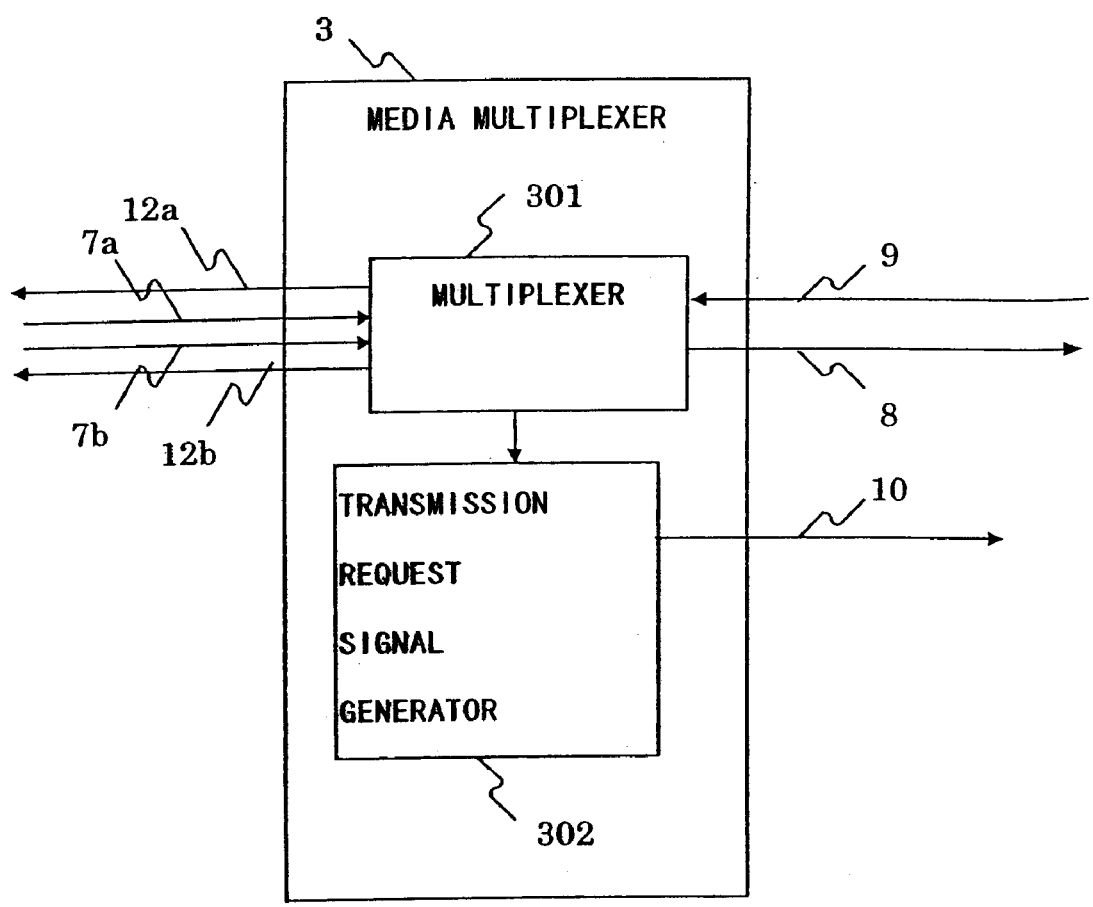
FIG. 11 shows a block diagram of a media multiplexer of the fourth embodiment of the present invention.

A fourth embodiment of the present invention is described with reference to FIGS. 10 and 11. FIGS. 10 and 11 show block diagrams illustrating the configurations of a rate control communication apparatus 1 and a media multiplexer 3, respectively, of this embodiment. FIGS. 10 and 11 show information amount control signal of information source data 12a, 12b (referred to as the information amount control signal 12a, 12b hereinafter). With reference to an interface relation between a media multiplexer 3 and a line interface unit 4 of this embodiment shown in FIG. 10 generalized with broken lines, any one of those described in the first through third embodiments may be employed.

An operation of the rate control communication apparatus of the fourth embodiment is now described. A multiplexer 301 in the media multiplexer 3 of this embodiment compares a generated and stored amount of the transmission data with a predetermined amount of transmission data to be outputted to the line interface unit 4 to detect an excess or a shortage of the transmission data generated and stored. A detected result is outputted to an information source encoder 2a, 2b as the information amount control signal 12a, 12b. The information source encoder 2a, 2b reduces an amount of encoded information to be generated when receiving the information amount control signal 12a, 12b indicating an excess of the transmission data, and increases the amount when receiving the signal indicating a shortage.

A constant bit rate communication can be achieved by the function described above with encoded information generated effectively achieving an efficient use of a transmission channel.

As aforementioned, a constant bit rate communication can be achieved by securing a constant bit rate with the rate control communication apparatus (of this embodiment) having the function of the media multiplexer comparing an amount of the transmission data being generated with a predetermined amount of transmission data to be outputted to the line interface unit to detect an excess or a shortage of the transmission data generated and stored, and outputting an encoded information amount control signal or the information source data information amount control signal to the information source encoder, and the function of the information source encoder controlling the amount of encoded information to be generated to be increased or decreased.

Embodiment 5

Figure 12:
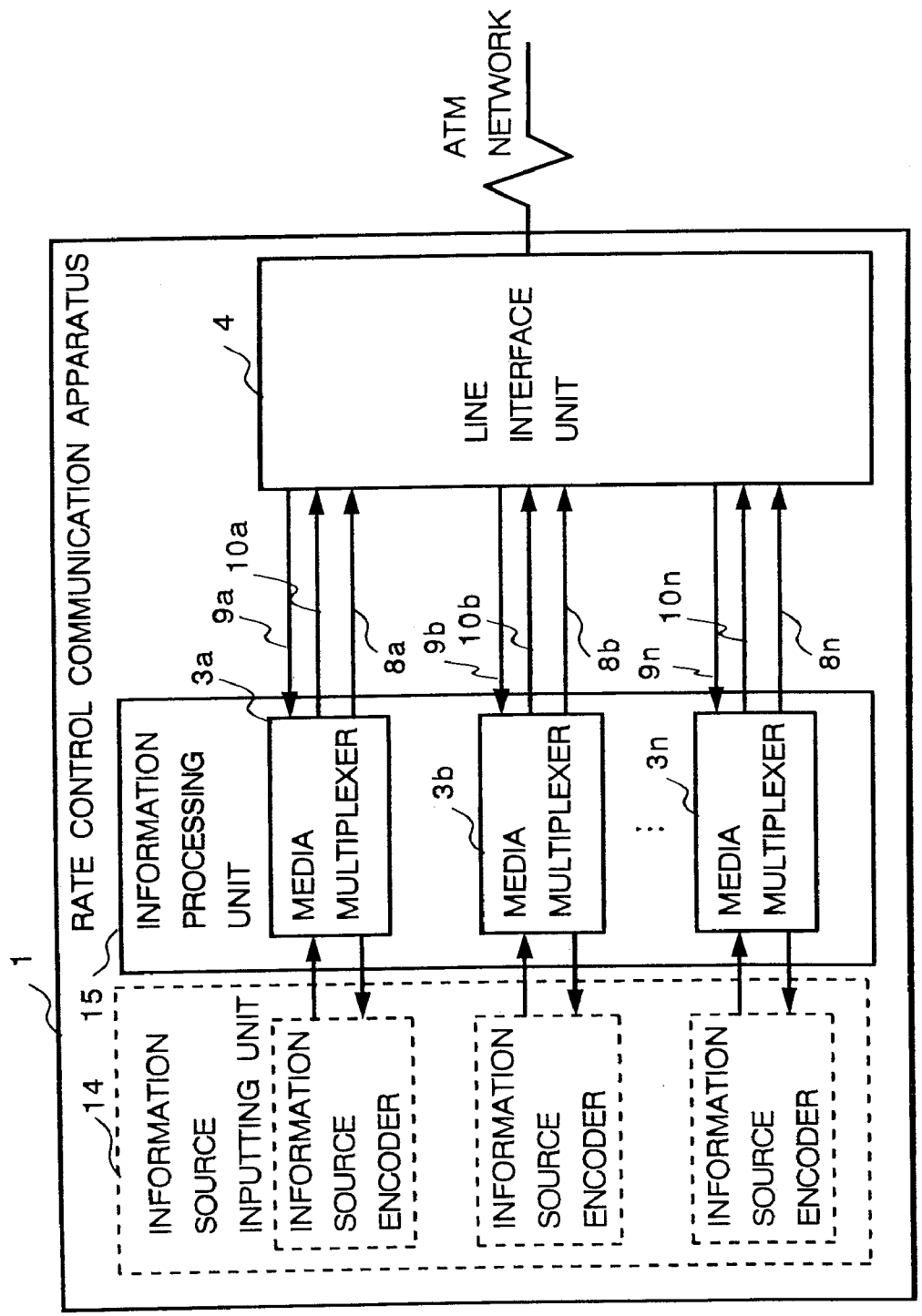
FIG. 12 shows a block diagram of a rate control communication apparatus according to a fifth embodiment of the present invention.
Figure 13:
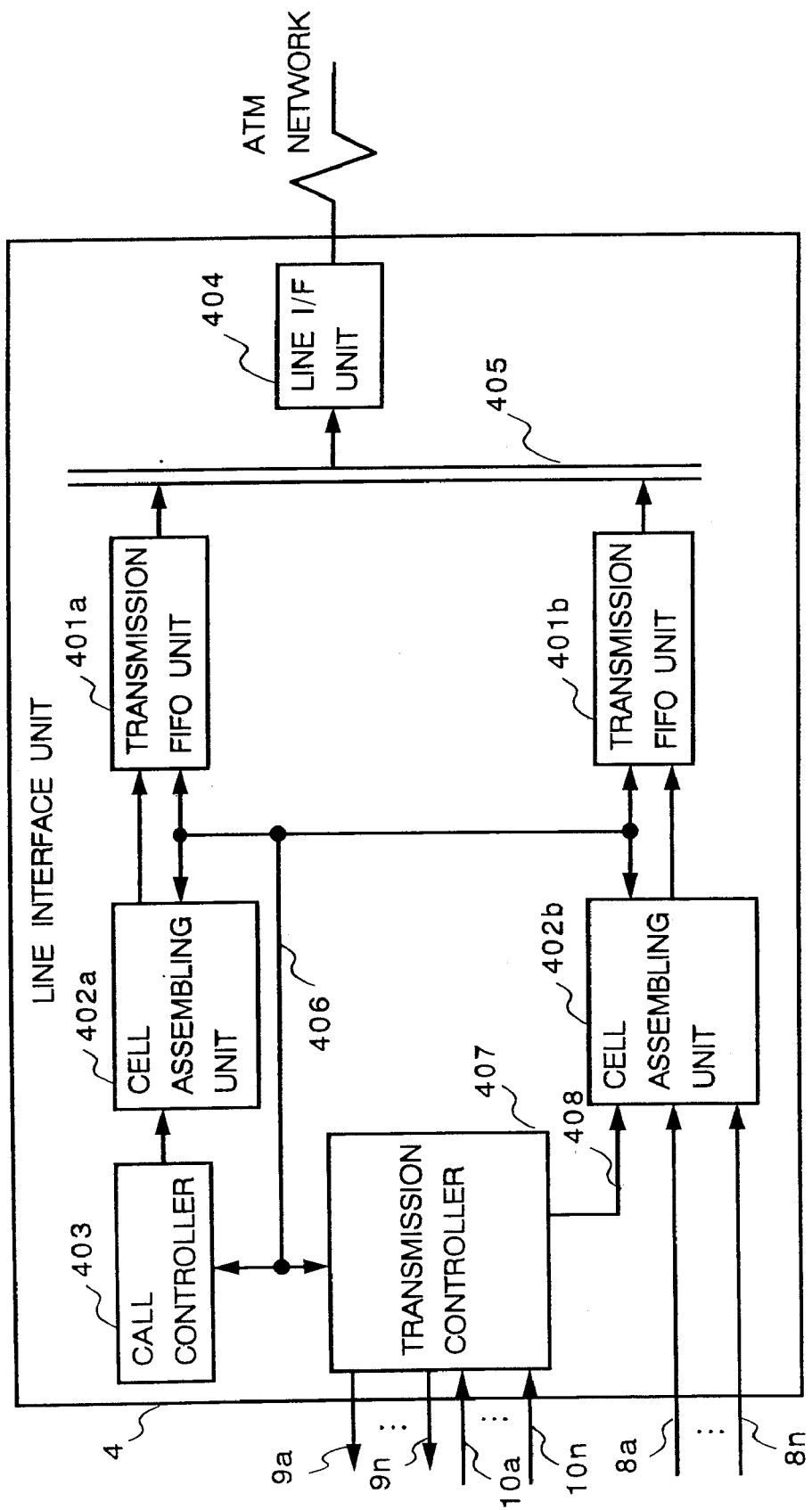
FIG. 13 shows a block diagram of a line interface unit of the fifth embodiment of the present invention.
Figure 14:
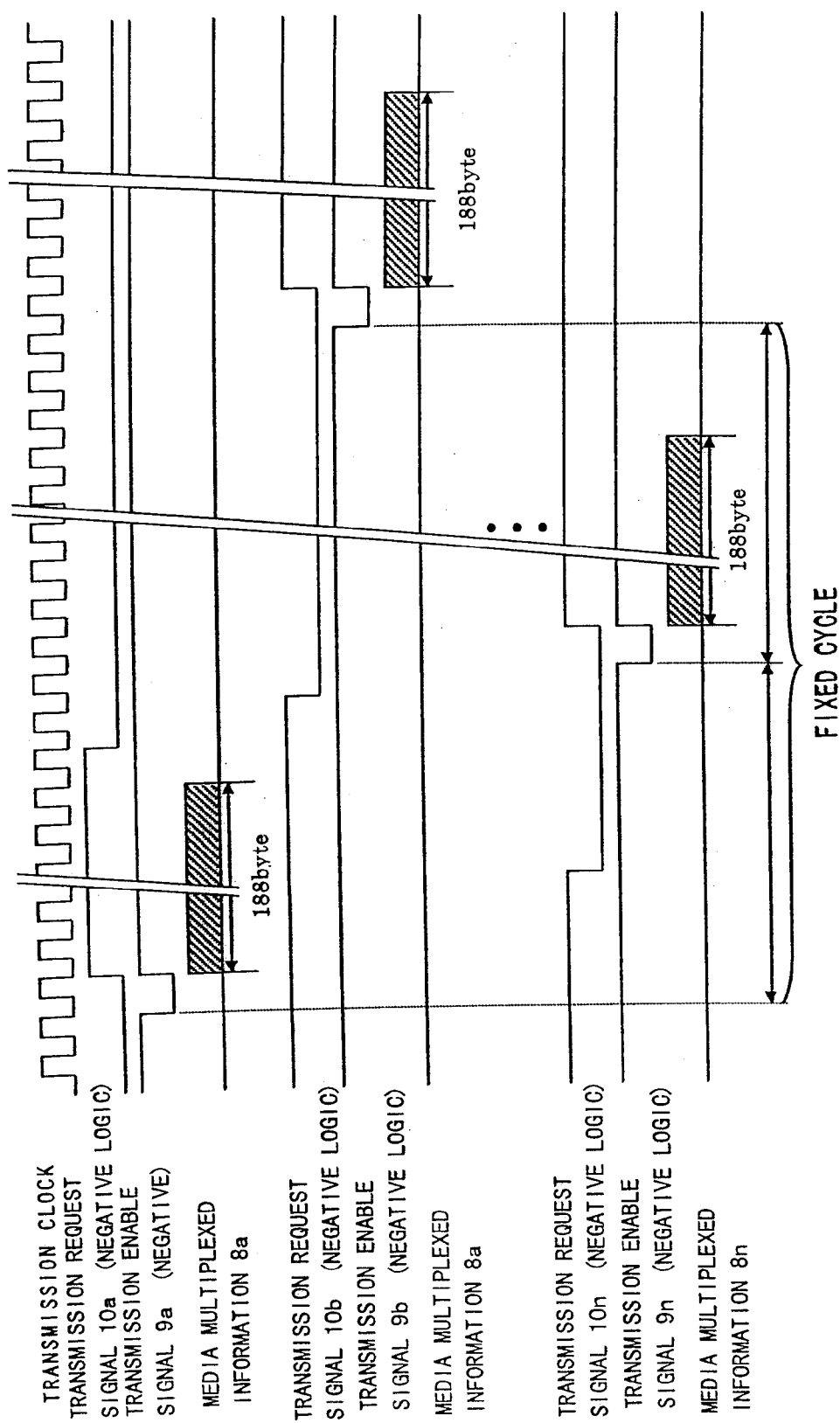
FIG. 14 is a timing chart illustrating an operation of the fifth embodiment of the present invention.

A fifth embodiment of the present invention is now discussed with reference to FIGS. 12 through 14. FIGS. 12 and 13 show block diagrams illustrating the configurations of a rate control communication apparatus 1 and a line interface unit 4, respectively, of this embodiment. The rate control communication apparatus of this embodiment is characterized with a plural number of media multiplexers 3a through 3n connected to the line interface unit 4. The line interface unit 4 receives transmission request signals 10a through 10n from the media multiplexers 3a through 3n and outputs one of transmission enable signals 9a through 9n to a corresponding media multiplexer at a certain timing. With reference to an interface relation between each of the media multiplexers 3a through 3n and the line interface unit 4 of this embodiment shown in FIG. 12 generalized with broken lines, any one of those described in the first through three embodiments may be employed.

An operation of the rate control communication apparatus of the fifth embodiment is now described. FIG. 14 is a timing chart illustrating the operation of the rate control communication apparatus of this embodiment. A transmission controller 407 in the line interface unit 4 monitors the reception of the transmission request signals 10a through 10n (i.e., negative logic signals in the chart) outputted from the media multiplexers 3a through 3n. Upon reception of one or more of the transmission request signals at the same time, the transmission controller 407 outputs one of the transmission enable signals 9a through 9n (i.e., negative logic signals in the chart) to a corresponding one of the media multiplexers 3a through 3n at a time. Upon reception of the transmission enable signals 9a through 9n, the media multiplexers 3a through 3n output transmission data 8a through 8n, respectively.

One of the transmission enable signals 9a through 9n is to be issued in each fixed output cycle. When none of the transmission enable signals 9a through 9n is outputted from the media multiplexers 3a through 3n with a certain cycle, the transmission controller 407 outputs the dummy data transmission indication signal 408 to a cell assembling unit 402b within the line interface unit 4 so as to supply dummy data alone for stuffing for a corresponding one of the transmission data 8a through 8n.

Thus, a constant bit rate communication can be achieved with multiplexed transmission data of the transmission data 8a through 8n from the media multiplexers 3a through 3n.

With reference to the transmission controller 407 outputting the dummy data transmission indication signal 408 to the cell assembling unit 402b of this embodiment, the transmission controller 407 may alternatively output the dummy data transmission indication signal 11 to one of the media multiplexers 3a through 3n in the same manner as that described in the second embodiment. The dummy data transmission indication signal 408 may be replaced with dummy data.

As aforementioned, a constant bit rate communication is achieved by securing a constant bit rate with the rate control communication apparatus of this embodiment having the function of monitoring a generated and stored condition of the respective transmission data in the plural number of media,multiplexers through the reception of the transmission request signals from the respective media multiplexers by the line interface unit, and outputting one of the transmission enable signals to a corresponding one of the media multiplexers at a certain timing and in this manner receiving and multiplexing the transmission data from the respective media multiplexers.

Embodiment 6

Figure 15:
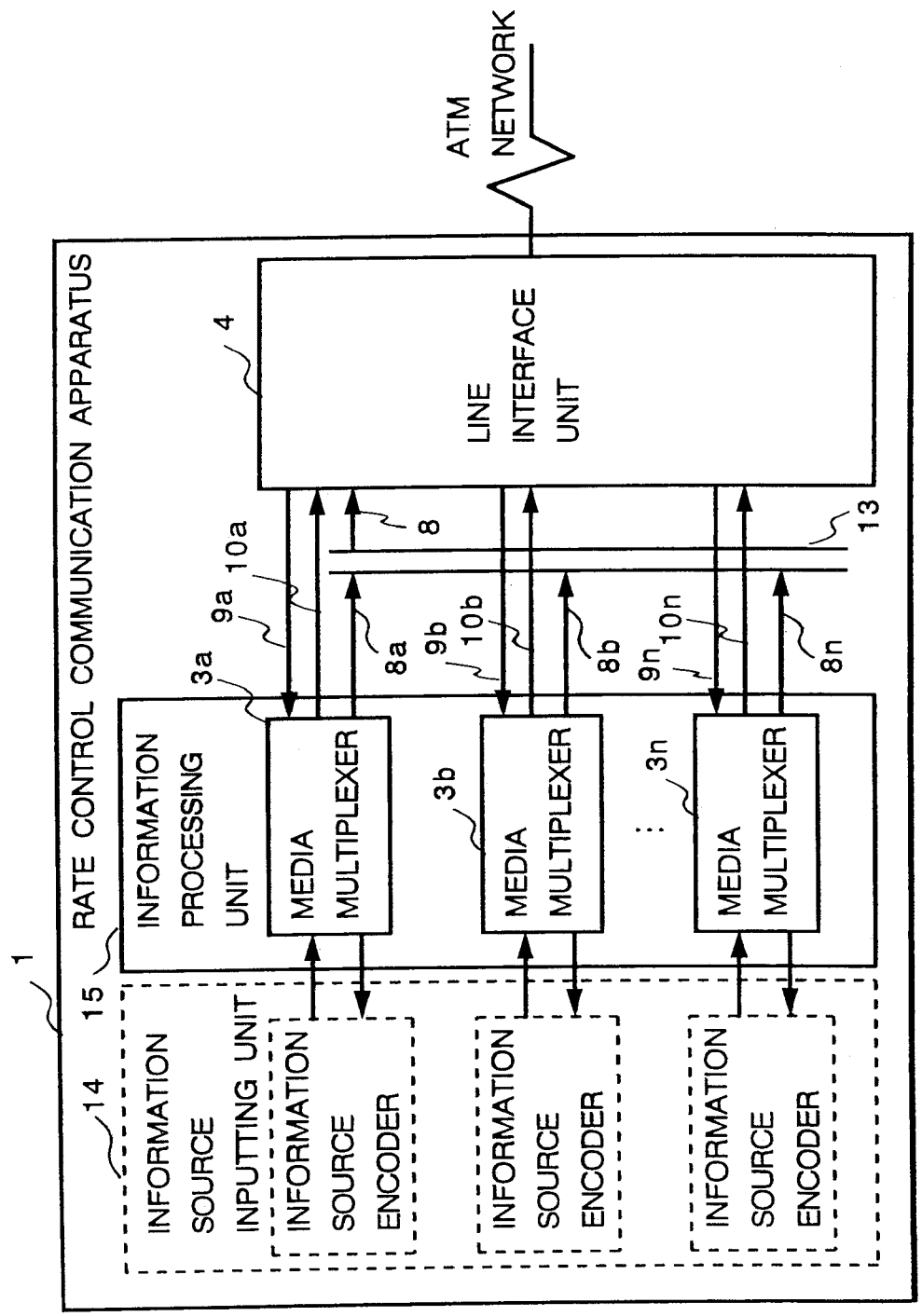
FIG. 15 shows a block diagram of a rate control communication apparatus according to a sixth embodiment of the present invention.
Figure 16:
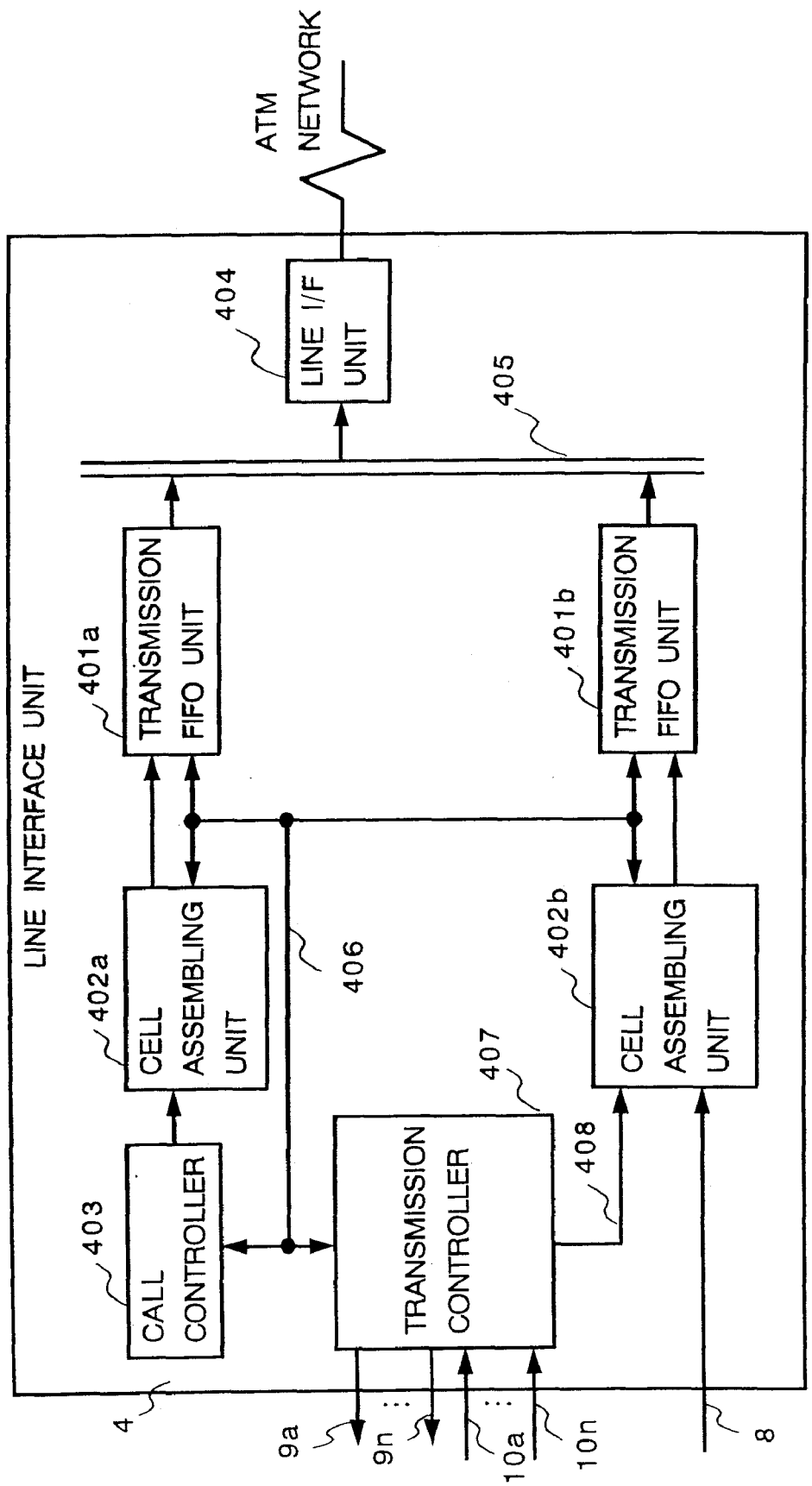
FIG. 16 shows a block diagram of a line interface unit of the sixth embodiment of the present invention.

A sixth embodiment of the present invention is now discussed with reference to FIGS. 15 and 16. FIGS. 15 and 16 show block diagrams illustrating the configurations of a rate control communication apparatus 1 and a line interface unit 4, respectively, of this embodiment. The rate control communication apparatus 1 of this embodiment is characterized with the transmission data 8a through 8n being transferred to the line interface unit 4 via a transmission data multiplexing bus 13, as shown in FIG. 15.

An operation of the rate control communication apparatus of the sixth embodiment is now described. According to this embodiment, the transmission data 8a through 8n from the media multiplexers 3a through 3n are multiplexed at the transmission data multiplexing bus 13. Multiplexed transmission data 8 are then outputted to the line interface unit 4.

This achieves a constant bit rate communication similar to that of the fifth embodiment with a simplified configuration of the circuitry contributing to an efficient multiplexing of the respective transmission data from the media multiplexers in the line interface unit 4.

A transmission controller 407 of this embodiment outputs the dummy data transmission indication signal 408 to the cell assembling unit 402b in the same manner as that described in the fifth embodiment. Alternatively, the transmission controller 407 may output the dummy data transmission indication signal 11 to one of the media multiplexers 3a through 3n in the same manner as that stated in the second embodiment. The dummy data transmission indication signal 408 may be replaced with dummy data.

As aforementioned, a constant bit rate communication can be achieved by securing a constant bit rate with the rate control communication apparatus of this embodiment provided with the transmission data multiplexing bus for multiplexing a plural number of the transmission data from the respective media multiplexers. The rate control communication apparatus is characterized with the function of the line interface unit for monitoring the generated and stored condition of the respective transmission data in the media multiplexers through the reception of the transmission request signals from the media multiplexers, and outputting one of the transmission enable signals to a corresponding one of the media multiplexers at a certain timing so as to have the transmission data outputted from the media multiplexers, and receiving the plural number of the transmission data 4t multiplexed at the transmission data multiplexing bus.

Embodiment 7

With reference to the fifth and sixth embodiments, a transmission controller 407 of a line interface unit 4 of a rate control communication apparatus according to another embodiment of the present invention may output the transmission enable signals 9a through 9n to the media multiplexers 3a through 3n based upon a fixed output frequency assigned individually to the respective media multiplexers.

This allows the transmission data 8a through 8n to be outputted on an individual constant bit rate basis from the media multiplexers 3a through 3n, thereby achieving a constant bit rate communication as a whole.

As aforementioned, a constant bit rate communication is achieved by securing a constant bit rate with the rate control communication apparatus of this embodiment including the line interface unit for outputting the transmission enable signals to the corresponding media multiplexers based upon the fixed output frequency assigned individually to the respective media multiplexers so as to have the respective transmission data outputted from the media multiplexers on an individual constant bit rate basis.

Embodiment 8

With further reference to the fifth and sixth embodiments, a transmission controller 407 of a line interface unit 4 of a rate control communication apparatus according to another embodiment of the present invention may output the transmission enable signals 9a through 9n to the corresponding media multiplexers 3a through 3n based upon an output priority assigned to the individual media multiplexers.

This achieves a loss free multiplexing of the transmission data 8a through 8n outputted from the respective media multiplexers 3a through 3n each having a different amount of the transmission data generated from others, thereby achieving a constant bit rate communication as a whole.

As aforementioned, a constant bit rate communication is achieved by securing a constant bit rate with the rate control communication apparatus of this embodiment including the line interface unit for outputting the transmission enable signals to the corresponding media multiplexers based upon the output priority assigned to each of the respective media multiplexers so as to have the transmission data outputted from the media multiplexers each having a different amount of the transmission data generated from others for a loss-free multiplexing.

Embodiment 9

With further reference to the fifth and sixth embodiments, a transmission controller 407 of a line interface unit 4 of a rate control communication apparatus according to another embodiment of the present invention monitors the reception of the transmission request signals 10a through 10n from the respective media multiplexers 3a through 3n to recognize the generation characteristics of the respective transmission data 8a through 8n whereby changing an output allocation of the transmission enable signals 9a through 9n to the corresponding media multiplexers 3a through 3n dynamically.

This allows each of the transmission data 8a through 8n from the corresponding media multiplexers 3a through 3n to be transmitted at a variable bit rate, thereby achieving a constant bit rate communication as a whole.

As aforementioned, a constant bit rate communication is achieved by securing a constant bit rate with the rate control communication apparatus (of this embodiment) including the line interface unit for monitoring the frequency of generation of each of the transmission request signals from the media multiplexers to recognize the generation characteristic of each of the respective transmission data in the media multiplexers, and outputting the respective transmission enable signals to the media multiplexers based upon the dynamic output allocation changed adaptively to the recognized generation characteristic, thereby allowing each of the transmission data from the respective media multiplexers to have a variable bit rate and achieving a constant bit rate communication as a whole.

Embodiment 10

With reference to the eighth embodiment, a transmission controller 407 of a line interface unit 4 of a rate control communication apparatus according to another embodiment of the present invention may output the transmission enable signals 9a through 9n to the media multiplexers 3a through 3n based upon a dynamic allocation of the output priority assigned to each of the media multiplexers changed adaptively to the reception of the transmission request signals 10a through 10n from the media multiplexers 3a through 3n.

This achieves a well balanced multiplexing of the transmission data 8a through 8n from the media multiplexers 3a through 3n, thereby achieving a constant bit rate communication as a whole.

As aforementioned, a constant bit rate communication is achieved by securing a constant bit rate with the rate control communication apparatus of this embodiment including the line interface unit for outputting the transmission enable signals to the media multiplexers based upon the dynamic allocation of the output priority assigned to each of the media multiplexers changed adaptively, thereby allowing the well balanced multiplexing of the transmission data from the respective media multiplexers.

Embodiment 11

With reference to the first through tenth embodiments, an information source processing unit 15 according to another embodiment of the present invention may store low output priority transmission data as a replacement for the dummy data for stuffing to be transmitted through a line when a communication band is not fully occupied by transmission data, and a line interface unit 4 transmits the low output priority transmission data through the line when the communication band is not fully occupied by transmission data.

This allows an efficient data transmission with an effective use of a transmission band, thereby achieving a constant bit rate communication as a whole.

With reference to the first through eleventh embodiments of the present invention, the present invention achieves a constant bit rate with multiplexed data of video data, audio data, information data and the like when transmitted over a communication network such as the ATM network on a packet format basis. In addition, the present invention is applicable, of course, to data when transmitted over a communication network designed for a constant bit rate communication such as a telephone line network, a communication satellite circuit network and the like, as disclosed in the first through tenth embodiments.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A rate control communication apparatus for transmitting data over a communication network, the rate control communication apparatus comprising:

an information source inputting unit for receiving information source data to be transmitted;

an information source processing unit for processing the information source data to generate transmission data in a predetermined data format;

a line interface unit for generating and outputting a transmission enable signal indicating a transmission enable status of the transmission data to the information source processing unit so as to have the transmission data outputted from the information source processing unit, for receiving the transmission data, and for transmitting the transmission data over the communication network, wherein dummy data is generated and outputted when an amount of the transmission data to be outputted to the line interface unit is less than a predetermined amount, and wherein the line interface unit includes a transmission control unit for calculating an output interval of the transmission enable signal, and for outputting the transmission enable signal to the information source processing unit based upon a calculated output interval.

2. The rate control communication apparatus of claim 1, wherein the information source processing unit includes a media multiplexer for multiplexing the information source data received from the information source inputting unit.

3. The rate control communication apparatus of claim 1, wherein the information source inputting unit includes an information source encoder for encoding the information source data.

4. A rate control communication apparatus for transmitting data over a communication network, the rate control communication apparatus comprising:

an information source inputting unit for receiving information source data to be transmitted;

an information source processing unit for processing the information source data to generate transmission data in a predetermined data format; and a line interface unit for generating and outputting a fixed-rate transmission enable signal indicating a transmission enable status of the transmission data to the information source processing unit so as to have the transmission data outputted at a fixed rate from the information source processing unit, for receiving the transmission data at said fixed rate, and for transmitting the transmission data at said fixed rate over the communication network, wherein the information source processing unit temporarily stores the transmission data to be outputted to the line interface unit, wherein the information source processing unit generates and outputs dummy data to the line interface unit when an amount of the transmission data temporarily stored to be outputted to the line interface unit is less than a predetermined amount, and wherein the information source processing unit includes a transmission request signal generator for generating a transmission request signal indicating a request for the transmission enable signal when the amount of the transmission data is more than the predetermined amount, and for outputting the transmission request signal to the line interface unit, wherein the line interface unit monitors and detects a reception of the transmission request signal.

5. The rate control communication apparatus of claim 4, wherein the line interface unit outputs the transmission enable signal to the information source processing unit when detecting the reception of the transmission request signal, and outputs a dummy data transmission indication signal indicating a request for transmitting the dummy data when detecting no reception of the transmission request signal, wherein the information source processing unit outputs the transmission data to the line interface unit upon reception of the transmission enable signal, and outputs the dummy data to the line interface unit upon reception of the dummy data transmission indication signal.

6. The rate control communication apparatus of claim 4, wherein the line interface unit generates and transmits dummy data over the communication network when detecting no reception of the transmission request signal.

7. The rate control communication apparatus of claim 4, wherein the information source processing unit outputs a first control signal to the information source inputting unit so as to reduce a receiving amount of the information source data when storing the transmission data generated in more than the predetermined amount to be outputted to the line interface unit, and outputs a second control signal to the information source inputting unit so as to increase the amount of the information source data to be received when storing the transmission data generated in less than the predetermined amount.

8. The rate control communication apparatus of claim 4, wherein the information source processing unit includes a plurality of information source processing units, wherein the line interface unit outputs a plurality of transmission enable signals respectively to the plurality of information source processing units, wherein the line interface unit monitors an amount of the transmission data generated in each of the plurality of information source processing units through receptions of transmission request signals respectively from the plurality of information source processing units, and outputs one of the plurality of transmission enable signals to a corresponding one of the plurality of information source processing units at a certain timing.

9. The rate control communication apparatus of claim 8 further comprising a transmission data multiplexing bus for receiving a plurality of transmission data outputted from the plurality of information source processing units, and for multiplexing the plurality of transmission data.

10. The rate control communication apparatus of claim 9, wherein the line interface unit allocates outputs of the transmission enable signals to the plurality of information source processing units so as to have a transmitting frequency of each of the plurality of transmission data from the plurality of information source processing units fixed.

11. The rate control communication apparatus of claim 8, wherein the line interface unit allocates outputs of the plurality of transmission enable signals to the plurality of information source processing units based upon a transmitting priority assigned to each of the plurality of information source units, the transmitting priority indicating a transmitting order among the plurality of transmission data.

12. The rate control communication apparatus of claim 8, wherein the line interface unit monitors receptions of the transmission request signals from the plurality of information source processing units to recognize a generation characteristic of each of the plurality of transmission data, and changes an output allocation of the plurality of transmission enable signals to corresponding information source processing units dynamically based upon the generation characteristic.

13. The rate control communication apparatus of claim 11, wherein the line interface unit changes the transmitting priority assigned to each of the plurality of information source processing units dynamically.

14. The rate control communication apparatus of claim 4, wherein the information source processing unit stores low priority transmission data to be transmitted through a line when a communication band is not fully occupied by transmission data, wherein the line interface unit transmits the low priority transmission data through the line when the communication band is not fully occupied by transmission data.

15. A rate control communication method for transmitting data over a communication network, the rate control communication method comprising the steps of:

inputting information source data to be transmitted;

processing the information source data to generate transmission data in a predetermined data format in an information source processing unit;

generating and outputting dummy data when an amount of the transmission data to be outputted to a line interface unit is less than a predetermined amount; and line interfacing for outputting a transmission enable signal generated in the line interface unit to the information source processing unit thereby indicating a transmission enable status of the transmission data generated in the processing step so as to have the transmission data outputted, for receiving the transmission data, and for transmitting the transmission data to the communication network, and wherein the line interface unit includes a transmission control unit for calculating an output interval of the transmission enable signal, and for outputting the transmission enable signal to the information source processing unit based upon a calculated output interval.

16. A rate control communication apparatus for transmitting data over a communication network, the rate control communication apparatus comprising:

an information source inputting unit for receiving information source data to be transmitted;

an information source processing unit for processing the information source data to generate transmission data in a predetermined data format; and a line interface unit for generating and outputting a transmission enable signal indicating a transmission enable status of the transmission data to the information source processing unit so as to have the transmission data outputted from the information source processing unit, for receiving the transmission data, and for transmitting the transmission data over the communication network, wherein dummy data is generated and outputted when an amount of the transmission data to be outputted to the line interface unit is less than a predetermined amount, and wherein the information source processing unit includes a transmission request signal generator for generating a transmission request signal, indicating a request for the transmission enable signal when the amount of the transmission data is more than the predetermined amount, and for outputting the transmission request signal to the line interface unit, wherein the line interface unit monitors and detects a reception of the transmission request signal.

17. A rate control communication apparatus for transmitting data over a communication network, the rate control communication apparatus comprising:

an information source inputting unit for receiving information source data to be transmitted;

an information source processing unit for processing the information source data to generate transmission data in a predetermined data format; and a line interface unit for generating and outputting a fixed-rate transmission enable signal indicating a transmission enable status of the transmission data to the information source processing unit so as to have the transmission data outputted at a fixed rate from the information source processing unit, for receiving the transmission data at said fixed rate, and for transmitting the transmission data at said fixed rate over the communication network, wherein the line interface unit includes a transmission control unit for calculating an output interval of the transmission enable signal, and for outputting the transmission enable signal to the information source processing unit based upon a calculated output interval.

18. The rate control communication apparatus of claim 17, wherein the information source processing unit temporarily stores the transmission data to be outputted to the line interface unit; and wherein the information source processing unit generates and outputs dummy data to the line interface unit when an amount of the transmission data temporarily stored to be outputted to the line interface unit is less than a predetermined amount.

19. A rate control communication method for transmitting data over a communication network, the rate control communication method comprising the steps of:

inputting information source data to be transmitted;

processing the information source data to generate transmission data in a predetermined data format in an information source processing unit; and line interfacing for outputting a fixed rate transmission enable signal generated in a line interface unit to the information source processing unit thereby indicating a transmission enable status of the transmission data generated in the processing step so as to have the transmission data outputted at a fixed rate, for receiving the transmission data at said fixed rate, and for transmitting the transmission data to the communication network at said fixed rate, wherein the line interface unit includes a transmission control unit for calculating an output interval of the transmission enable signal, and for outputting the transmission enable signal to the information source processing unit based upon a calculated output interval.

* * * * *